US011646859B2

(12) United States Patent
Zhang et al.

(10) Patent No.: US 11,646,859 B2
(45) Date of Patent: May 9, 2023

(54) UNIFIED TRANSMISSION CONFIGURATION INDICATOR WINDOWS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/349,504

(22) Filed: Jun. 16, 2021

(65) Prior Publication Data

US 2022/0407669 A1    Dec. 22, 2022

(51) Int. Cl.
*H04L 5/14* (2006.01)
*H04W 72/23* (2023.01)

(52) U.S. Cl.
CPC .............. *H04L 5/14* (2013.01); *H04W 72/23* (2023.01)

(58) Field of Classification Search
CPC ................................. H04L 5/14; H04W 72/23
See application file for complete search history.

(56) References Cited

U.S. PATENT DOCUMENTS

| | | | | |
|---|---|---|---|---|
| 11,258,575 B2* | 2/2022 | Abedini | ............... | H04B 7/0695 |
| 11,317,412 B2* | 4/2022 | Rahman | ................ | H04L 5/0051 |
| 11,463,869 B2* | 10/2022 | Abdelghaffar | ............ | H04L 5/14 |
| 11,546,902 B2* | 1/2023 | Rahman | .............. | H04W 72/044 |
| 11,576,184 B2* | 2/2023 | Rahman | ................ | H04L 5/0023 |
| 2020/0260428 A1* | 8/2020 | Xu | ......................... | H04L 5/0023 |
| 2020/0413390 A1* | 12/2020 | Rahman | ................ | H04L 5/0048 |
| 2021/0014848 A1* | 1/2021 | Davydov | .............. | H04L 5/0051 |
| 2021/0226689 A1* | 7/2021 | Farag | .................. | H04B 7/0695 |
| 2021/0227530 A1* | 7/2021 | Farag | ................... | H04L 5/0091 |

(Continued)

FOREIGN PATENT DOCUMENTS

WO    WO-2021227828 A1 * 11/2021
WO    WO-2022198360 A1 *  9/2022

OTHER PUBLICATIONS

Samsung, Moderator summary for multi-beam enhancement: Round 4, May 10, 2021, 3GPP TSG RAN WG1 #105-e, Agenda Item: 8.1.1, Tdoc: R1-2106285 (Year: 2021).*

(Continued)

*Primary Examiner* — Eric Nowlin
(74) *Attorney, Agent, or Firm* — ArentFox Schiff LLP

(57) ABSTRACT

Example aspects include a method, apparatus, and computer-readable medium for wireless communication at a user equipment (UE) of a wireless communication network, comprising receiving, from a base station, configuration information scheduling one or more full-duplex communications and one or more half-duplex communications. A first unified transmission configuration indicator (TCI) window corresponding to the one or more full-duplex communications. A second unified TCI window corresponding to the one or more half-duplex communications. The aspects further include performing full-duplex communications according to the first unified TCI window for a first time period having a first length. Additionally, the aspects further include performing half-duplex communications according to the second unified TCI window for a second time period having a second length.

30 Claims, 13 Drawing Sheets

(56) References Cited

U.S. PATENT DOCUMENTS

| | | | |
|---|---|---|---|
| 2021/0274503 A1* | 9/2021 | Farag | H04B 7/0695 |
| 2021/0314953 A1* | 10/2021 | Park | H04W 76/11 |
| 2021/0321373 A1* | 10/2021 | Rahman | H04B 7/088 |
| 2021/0321378 A1* | 10/2021 | Rahman | H04W 72/21 |
| 2021/0328641 A1* | 10/2021 | Xu | H04B 7/0617 |
| 2021/0337525 A1* | 10/2021 | Rahman | H04W 16/28 |
| 2021/0337547 A1* | 10/2021 | Rahman | H04L 5/0048 |
| 2021/0378042 A1* | 12/2021 | Cui | H04L 5/0023 |
| 2021/0410147 A1* | 12/2021 | Xu | H04W 80/02 |
| 2022/0069884 A1* | 3/2022 | Zhang | H04B 17/318 |
| 2022/0109550 A1* | 4/2022 | Bai | H04L 5/16 |
| 2022/0182211 A1* | 6/2022 | Zhang | H04L 5/14 |
| 2022/0322113 A1* | 10/2022 | Zhang | H04B 7/063 |
| 2022/0376851 A1* | 11/2022 | Noh | H04L 5/0023 |
| 2022/0376880 A1* | 11/2022 | Zhang | H04B 7/063 |
| 2022/0417767 A1* | 12/2022 | Li | H04B 7/0695 |
| 2023/0015915 A1* | 1/2023 | Zhang | H04L 5/1469 |
| 2023/0033141 A1* | 2/2023 | Matsumura | H04L 5/0051 |
| 2023/0044880 A1* | 2/2023 | Cao | H04B 7/0695 |
| 2023/0046727 A1* | 2/2023 | Jung | H04L 1/08 |

OTHER PUBLICATIONS

Samsung, Moderator summary for multi-beam enhancement: Round 3, May 10, 2021, 3GPP TSG RAN WG1 #105-e, Agenda Item: 8.1.1, Tdoc: R1-2106167 (Year: 2021).*

Samsung, Moderator summary for multi-beam enhancement: Round 2, May 10, 2021, 3GPP TSG RAN WG1 #105-e, Agenda Item: 8.1.1, Tdoc: R1-2106131 (Year: 2021).*

Samsung, Moderator summary for multi-beam enhancement: Round 1, May 10, 2021, 3GPP TSG RAN WG1 #105-e, Agenda Item: 8.1.1, Tdoc: R1-2106086 (Year: 2021).*

Ericsson, Enhancements on Multi-beam Operation, May 10, 2021, 3GPP TSG RAN WG1 #105-e, Agenda Item: 8.1.1, Tdoc: R1-2105828 (Year: 2021).*

Asia Pacific Telecom et al., Discussion on Enhancements for Multi-beam Operation, May 10, 2021, 3GPP TSG RAN WG1 #105-e, Agenda Item: 8.1.1, Tdoc: R1-2105816 (Year: 2021).*

LG Electronics, Enhancements on Multi-beam Operation, May 10, 2021, 3GPP TSG RAN WG1 #105-e, Agenda Item: 8.1.1, Tdoc: R1-2105779 (Year: 2021).*

NTT Docomo, Inc, Discussion on Multi-beam Operation, May 10, 2021, 3GPP TSG RAN WG1 #105-e, Agenda Item: 8.1.1, Tdoc: R1-2105683 (Year: 2021).*

AT&T, Enhancements on Multi-Beam Operations, May 10, 2021, 3GPP TSG RAN WG1 #105-e, Agenda Item: 8.1.1, Tdoc: R1-2105665 (Year: 2021).*

Convida Wireless, Enhancements on Multi-beam Operation, May 10, 2021, 3GPP TSG RAN WG1 #105-e, Agenda Item: 8.1.1, Tdoc: R1-2105588 (Year: 2021).*

Xiaomi, Enhancements on Multi-beam Operation, May 10, 2021, 3GPP TSG RAN WG1 #105-e, Agenda Item: 8.1.1, Tdoc: R1-2105540 (Year: 2021).*

Samsung, Moderator summary for offline discussion on multi-beam enhancement: CA QCL and unified TCI for 'other signals/channels', May 10, 2021, 3GPP TSG RAN WG1 #105-e, Agenda Item: 8.1.1, Tdoc: R1-2105296 (Year: 2021).*

Samsung, Multi-beam Enhancements, May 10, 2021, 3GPP TSG RAN WG1 #105-e, Agenda Item: 8.1.1, Tdoc: R1-2105291 (Year: 2021).*

Samsung, Moderator Summary for Multi-beam Enhancement, May 10, 2021, 3GPP TSG RAN WG1 #105-e, Agenda Item: 8.1.1, Tdoc: R1-2105290 (Year: 2021).*

Nokia et al., Enhancements on Multi-beam Operation, May 10, 2021, 3GPP TSG RAN WG1 #105-e, Agenda Item: 8.1.1, Tdoc: R1-2105273 (Year: 2021).*

NEC, Discussion on Multi-beam Operation, May 10, 2021, 3GPP TSG RAN WG1 #105-e, Agenda Item: 8.1.1, Tdoc: R1-2105246 (Year: 2021).*

Fraunhofer IIS et al., Enhancements on Multi-beam Operation, May 10, 2021, 3GPP TSG RAN WG1 #105-e, Agenda Item: 8.1.1, Tdoc: R1-2105231 (Year: 2021).*

Sony, Further Enhancement on Multi-beam Operation, May 10, 2021, 3GPP TSG RAN WG1 #105-e, Agenda Item: 8.1.1, Tdoc: R1-2105151 (Year: 2021).*

Fujitsu, Enhancements on Multi-beam Operation, May 10, 2021, 3GPP TSG RAN WG1 #105-e, Agenda Item: 8.1.1, Tdoc: R1-2105058 (Year: 2021).*

Intel Corporation, Enhancements to Multi-Beam Operation, May 10, 2021, 3GPP TSG RAN WG1 #105-e, Agenda Item: 8.1.1, Tdoc: R1-2104888 (Year: 2021).*

Oppo, Enhancements on Multi-Beam Operation, May 10, 2021, 3GPP TSG RAN WG1 #105-e, Agenda Item: 8.1.1, Tdoc: R1-2104732 (Year: 2021).*

Qualcomm Incorporated, Enhancements on Multi-beam Operation, May 10, 2021, 3GPP TSG RAN WG1 #105-e, Agenda Item: 8.1.1, Tdoc: R1-2104654 (Year: 2021).*

CMCC, Enhancements on Multi-beam Operation, May 10, 2021, 3GPP TSG RAN WG1 #105-e, Agenda Item: 8.1.1, Tdoc: R1-2104599 (Year: 2021).*

ZTE, Enhancements on Multi-beam Operation, May 10, 2021, 3GPP TSG RAN WG1 #105-e, Agenda Item: 8.1.1, Tdoc: R1-2104585 (Year: 2021).*

CATT, Enhancements on multi-beam operation, May 19, 2021, 3GPP TSG RAN WG1 #105-e, Agenda Item: 8.1.1, Tdoc: R1-2104484 (Year: 2021).*

Spreadtrum Communications, Enhancements on Multi-beam Operation, May 10, 2021, 3GPP TSG RAN WG1 #105-e, Agenda Item: 8.1.1, Tdoc: R1-2104411 (Year: 2021).*

Lenovo et al., Enhancements on Multi-beam Operation, May 10, 2021, 3GPP TSG RAN WG1 #105-e, Agenda Item: 8.1.1, Tdoc: R1-2104404 (Year: 2021).*

Interdigital, Inc., Remaining Issues on Rel-17 Multi-beam Operation, May 10, 2021, 3GPP TSG RAN WG1 #105-e, Agenda Item: 8.1.1, Tdoc: R1-2104292 (Year: 2021).*

Huawei et al., Enhancements on multi-beam operation, May 10, 2021, 3GPP TSG RAN WG1 #105-e, Agenda Item: 8.1.1, Tdoc: R1-2104266 (Year: 2021).*

Futurewei, Enhancement on multi-beam operation, May 19, 2021, 3GPP TSG RAN WG1 #105-e, Agenda Item: 8.1.1, Tdoc: R1-2104205 (Year: 2021).*

Samsung, Moderator summary#5 for multi-beam enhancement: Round 4, Apr. 12, 2021, 3GPP TSG RAN WG1 #104b-e, Agenda Item: 8.1.1, Tdoc: R1-2103953 (Year: 2021).*

Asustek, Discussion on multi-beam operation, Apr. 12, 2021, 3GPP TSG RAN WG1 #104b-e, Agenda Item: 8.1.1, Tdoc: R1-2103637 (Year: 2021).*

NTT Docomo, Inc, Discussion on Multi-beam Operation, Apr. 12, 2021, 3GPP TSG RAN WG1 #104b-e, Agenda Item: 8.1.1, Tdoc: R1-2103559 (Year: 2021).*

NEC, Discussion on Multi-beam Operation, Apr. 12, 2021, 3GPP TSG RAN WG1 #104b-e, Agenda Item: 8.1.1, Tdoc: R1-2103521 (Year: 2021).*

LG Electronics, Enhancements on Multi-beam Operation, Apr. 12, 2021, 3GPP TSG RAN WG1 #104b-e, Agenda Item: 8.1.1, Tdoc: R1-2103504 (Year: 2021).*

AT&T, Enhancements on Multi-Beam Operations, Apr. 12, 2021, 3GPP TSG RAN WG1 #104b-e, Agenda Item: 8.1.1, Tdoc: R1-2103440 (Year: 2021).*

Convida Wireless, Enhancements on Multi-beam Operation, Apr. 12, 2021, 3GPP TSG RAN WG1 #104b-e, Agenda Item: 8.1.1, Tdoc: R1-2103408 (Year: 2021).*

Nokia et al., Enhancements on Multi-beam Operation, Apr. 12, 2021, 3GPP TSG RAN WG1 #104b-e, Agenda Item: 8.1.1, Tdoc: R1-2103365 (Year: 2021).*

Sony, Further Enhancement on Multi-beam Operation, Apr. 12, 2021, 3GPP TSG RAN WG1 #104b-e, Agenda Item: 8.1.1, Tdoc: R1-2103287 (Year: 2021).*

Samsung, Additional Enhancements for Multi-beam, Apr. 12, 2021, 3GPP TSG RAN WG1 #104b-e, Agenda Item: 8.1.1, Tdoc: R1-2103228 (Year: 2021).*

(56) References Cited

OTHER PUBLICATIONS

Samsung, Multi-beam Enhancements, Apr. 12, 2021, 3GPP TSG RAN WG1 #104b-e, Agenda Item: 8.1.1, Tdoc: R1-2103221 (Year: 2021).*

Samsung, Moderator Summary for Multi-beam Enhancement, Apr. 12, 2021, 3GPP TSG RAN WG1 #104b-e, Agenda Item: 8.1.1, Tdoc: R1-2103220 (Year: 2021).*

Xiaomi, Enhancements on Multi-beam Operation, Apr. 12, 2021, 3GPP TSG RAN WG1 #104b-e, Agenda Item: 8.1.1, Tdoc: R1-2102959 (Year: 2021).*

Ericsson, Enhancements on Multi-beam Operation, Apr. 12, 2021, 3GPP TSG RAN WG1 #104b-e, Agenda Item: 8.1.1, Tdoc: R1-2102954 (Year: 2021).*

Lenovo et al., Enhancements on Multi-beam Operation, Apr. 12, 2021, 3GPP TSG RAN WG1 #104b-e, Agenda Item: 8.1.1, Tdoc: R1-2102838 (Year: 2021).*

Fraunhofer IIS et al., Enhancements on Multi-beam Operation, Apr. 12, 2021, 3GPP TSG RAN WG1 #104b-e, Agenda Item: 8.1.1, Tdoc: R1-2102808 (Year: 2021).*

Futurewei, Enhancement on Multi-beam Operation, Apr. 12, 2021, 3GPP TSG RAN WG1 #104b-e, Agenda Item: 8.1.1, Tdoc: R1-2102767 (Year: 2021).*

Asia Pacific Telecom et al., Discussion on Enhancements for Multi-beam Operation, Apr. 12, 2021, 3GPP TSG RAN WG1 #104b-e, Agenda Item: 8.1.1, Tdoc: R1-2102725 (Year: 2021).*

Fujitsu, Enhancements on Multi-beam Operation, Apr. 12, 2021, 3GPP TSG RAN WG1 #104b-e, Agenda Item: 8.1.1, Tdoc: R1-2102712 (Year: 2021).*

ZTE, Further details on Multi-beam and Multi-TRP operation, Apr. 12, 2021, 3GPP TSG RAN WG1 #104b-e, Agenda Item: 8.1.1, Tdoc: R1-2102667 (Year: 2021).*

ZTE, Enhancements on Multi-beam Operation, Apr. 12, 2021, 3GPP TSG RAN WG1 #104b-e, Agenda Item: 8.1.1, Tdoc: R1-2102660 (Year: 2021).*

MediaTek Inc., Enhancement on multi-beam operation, Apr. 12, 2021, 3GPP TSG RAN WG1 #104b-e, Agenda Item: 8.1.1, Tdoc: R1-2105353 (Year: 2021).*

Qualcomm Incorporated, Enhancements on Multi-beam Operation, Apr. 12, 2021, 3GPP TSG RAN WG1 #104b-e, Agenda Item: 8.1.1, Tdoc: R1-2103150 (Year: 2021).*

MediaTek Inc., Enhancement on Multi-beam Operation, Apr. 12, 2021, 3GPP TSG RAN WG1 #104b-e, Agenda Item: 8.1.1, Tdoc: R1-2102675 (Year: 2021).*

Intel Corporation, Enhancements to Multi-Beam Operation, Apr. 12, 2021, 3GPP TSG RAN WG1 #104b-e, Agenda Item: 8.1.1, Tdoc: R1-2103014 (Year: 2021).*

CATT, Discussions on enhancements on multi-beam operation, Apr. 12, 2021, 3GPP TSG RAN WG1 #104b-e, Agenda Item: 8.1.1, Tdoc: R1-2102598 (Year: 2021).*

* cited by examiner

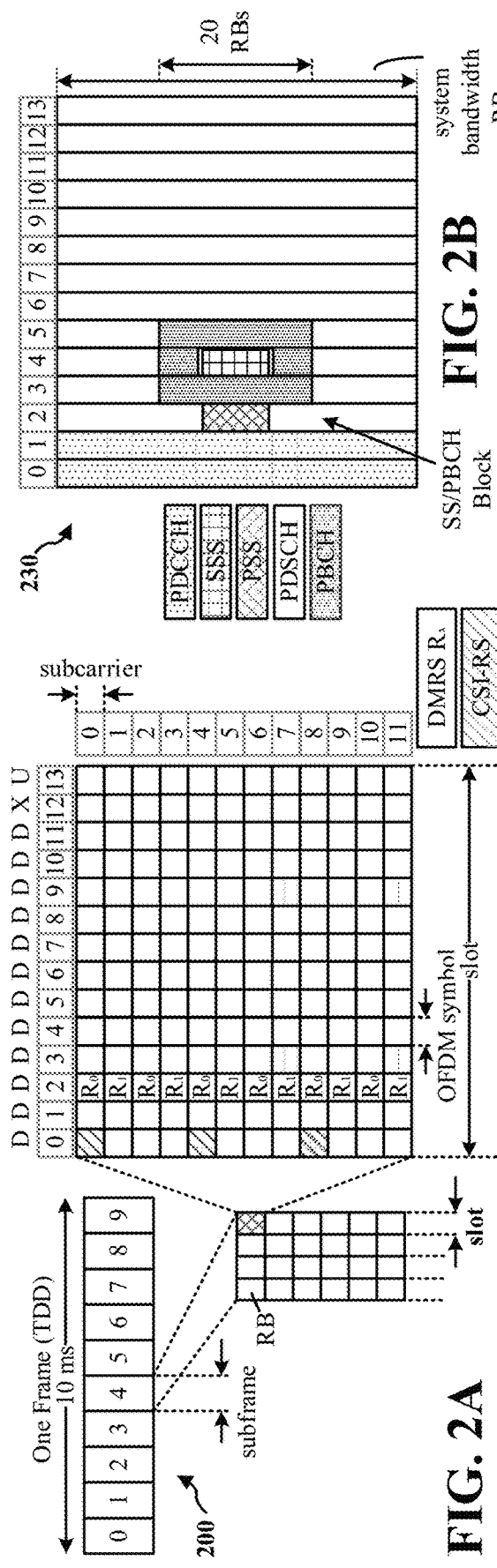
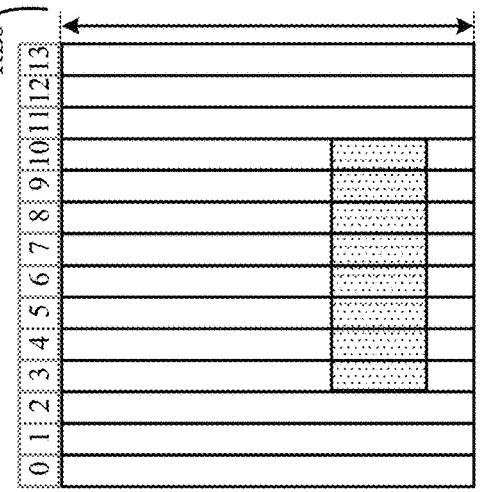
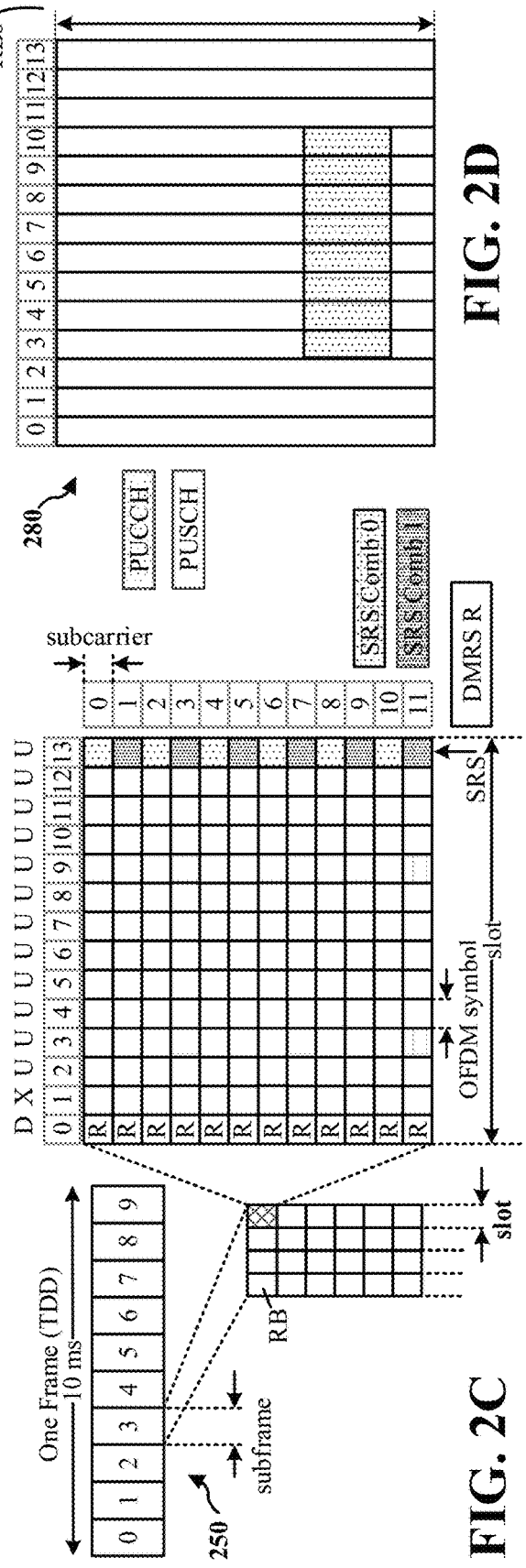
FIG. 2A  FIG. 2B  FIG. 2C  FIG. 2D

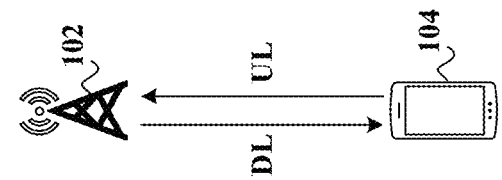
FIG. 4C
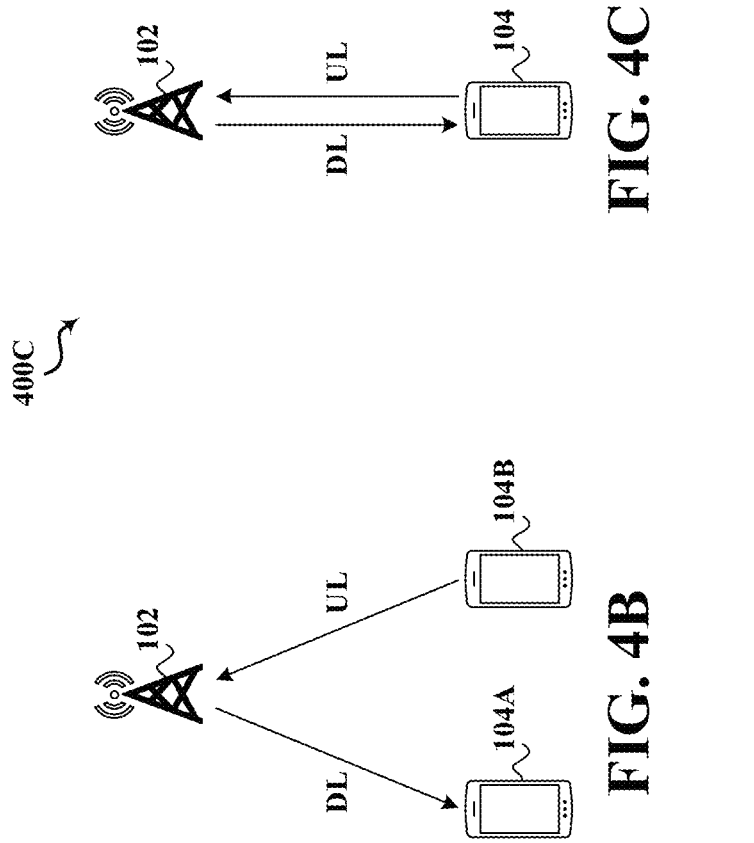
FIG. 4B
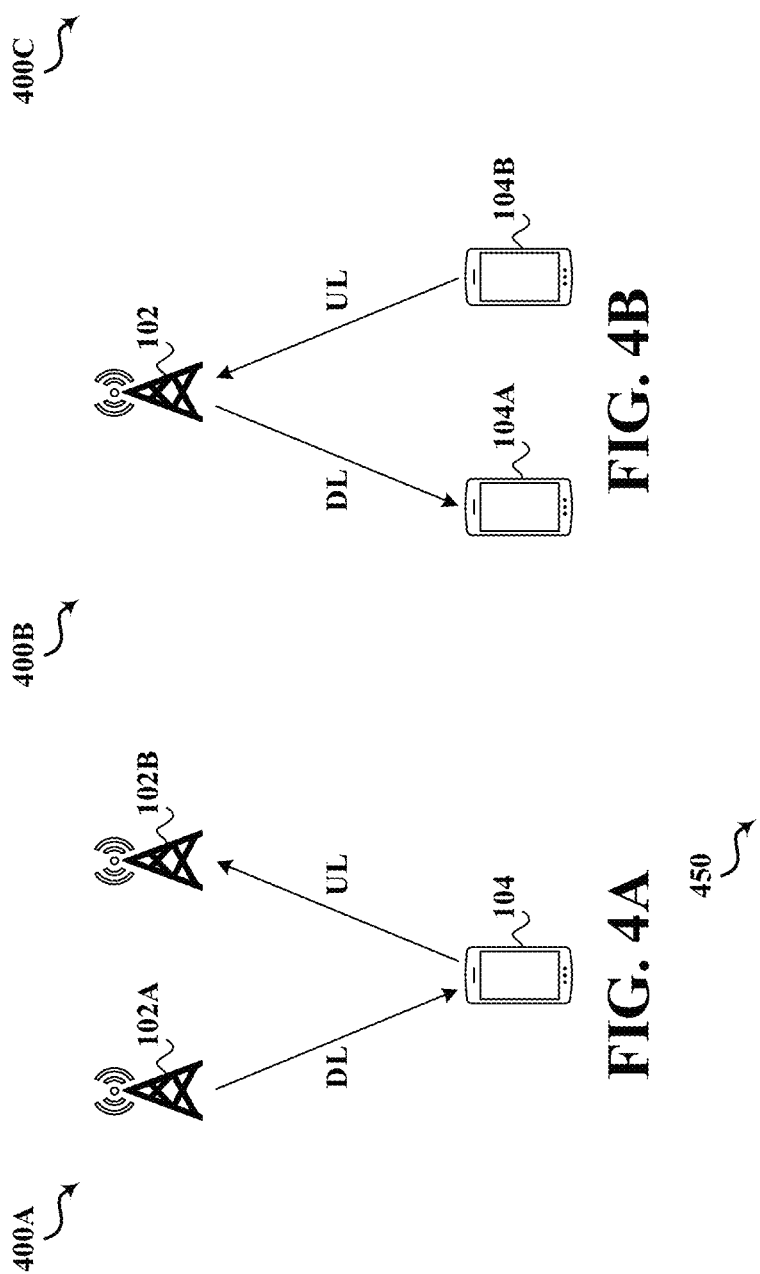
FIG. 4A
FIG. 4D

1300

```
┌──────────────────────────────────────────────────────────┐ 1410
│ Transmitting, to the UE during a time period corresponding to a
│ particular unified TCI window, additional configuration
│ information indicating a new TCI state, the new TCI state being
│ different to a current unified TCI state that corresponds to the
│ particular unified TCI window, causing the UE to discard the
│ additional configuration information indicating the new TCI state,
│ the particular unified TCI window comprising at least one of the
│ first unified TCI window and the second unified TCI window
└──────────────────────────────────────────────────────────┘
                              │
                              ▼
┌──────────────────────────────────────────────────────────┐ 1420
│ Performing additional communications according to the particular
│ unified TCI window using the current unified TCI state
└──────────────────────────────────────────────────────────┘
```

```
┌──────────────────────────────────────────────────────────┐ 1510
│ Transmitting, to the UE during a time period corresponding to a
│ particular unified TCI window, additional configuration
│ information indicating a new TCI state, the new TCI state being
│ different to a current unified TCI state that corresponds to the
│ particular unified TCI window, the particular unified TCI window
│ comprising at least one of the first unified TCI window and the
│ second unified TCI window
└──────────────────────────────────────────────────────────┘
                              │
                              ▼
┌──────────────────────────────────────────────────────────┐ 1520
│ Performing additional communications according to the particular
│ unified TCI window using the new TCI state
└──────────────────────────────────────────────────────────┘
```

FIG. 15

UNIFIED TRANSMISSION CONFIGURATION INDICATOR WINDOWS

BACKGROUND

Technical Field

The described aspects relate generally to wireless communication systems, and more particularly, to apparatuses and methods for scheduling of full-duplex and/or half-duplex communications using unified transmission configuration indicator (TCI) windows.

Introduction

Wireless communication systems are widely deployed to provide various telecommunication services such as telephony, video, data, messaging, and broadcasts. Conventional wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication systems may perform full-duplex and/or half-duplex communications. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

An example aspect includes a method of wireless communication by a user equipment (UE) of a wireless communication network, comprising receiving, from a base station, configuration information scheduling one or more full-duplex communications and one or more half-duplex communications. A first unified transmission configuration indicator (TCI) window corresponds to the one or more full-duplex communications. A second unified TCI window corresponds to the one or more half-duplex communications. The method further includes performing full-duplex communications according to the first unified TCI window for a first time period having a first length. Additionally, the method further includes performing half-duplex communications according to the second unified TCI window for a second time period having a second length.

Another example aspect includes an apparatus of wireless communication by a UE of a wireless communication network, comprising a memory storing instructions and a processor communicatively coupled with the memory. The processor is configured to execute the instructions to receive, from a base station, configuration information scheduling one or more full-duplex communications and one or more half-duplex communications. A first unified TCI window corresponds to the one or more full-duplex communications. A second unified TCI window corresponds to the one or more half-duplex communications. The processor is further configured to execute the instructions to perform full-duplex communications according to the first unified TCI window for a first time period having a first length. Additionally, the processor is further configured to execute the instructions to perform half-duplex communications according to the second unified TCI window for a second time period having a second length.

Another example aspect includes an apparatus of wireless communication by a UE of a wireless communication network, comprising means for receiving, from a base station, configuration information scheduling one or more full-duplex communications and one or more half-duplex communications. A first unified TCI window corresponds to the one or more full-duplex communications. A second unified TCI window corresponds to the one or more half-duplex communications. The apparatus further includes means for performing full-duplex communications according to the first unified TCI window for a first time period having a first length. Additionally, the apparatus further includes means for performing half-duplex communications according to the second unified TCI window for a second time period having a second length.

Another example aspect includes a computer-readable medium (e.g., non-transitory computer-readable medium) storing instructions for wireless communication by a UE of a wireless communication network, executable by a processor, to receive, from a base station, configuration information scheduling one or more full-duplex communications and one or more half-duplex communications. A first unified TCI window corresponds to the one or more full-duplex communications. A second unified TCI window corresponds to the one or more half-duplex communications. The instructions are further executable to perform full-duplex communications according to the first unified TCI window for a first time period having a first length. Additionally, the instructions are further executable to perform half-duplex communications according to the second unified TCI window for a second time period having a second length.

Another example aspect includes a method of wireless communication by a network node of a wireless communication network, comprising transmitting, to a UE, configuration information scheduling one or more full-duplex communications and one or more half-duplex communications. A first unified TCI window corresponds to the one or more full-duplex communications. A second unified TCI window corresponds to the one or more half-duplex communications. The method further includes performing full-duplex communications according to the first unified TCI window for a first time period having a first length. Additionally, the method further includes performing half-duplex communications according to the second unified TCI window for a second time period having a second length.

Another example aspect includes an apparatus of wireless communication by a network node of a wireless communication network, comprising a memory storing instructions and a processor communicatively coupled with the memory. The processor is configured to execute the instructions to transmit, to a UE, configuration information scheduling one or more full-duplex communications and one or more half-duplex communications. A first unified TCI window corresponds to the one or more full-duplex communications. A second unified TCI window corresponds to the one or more half-duplex communications. The processor is further configured to execute the instructions to perform full-duplex communications according to the first unified TCI window for a first time period having a first length. Additionally, the processor is further configured to execute the instructions to perform half-duplex communications according to the second unified TCI window for a second time period having a second length.

Another example aspect includes an apparatus of wireless communication by a network node of a wireless communication network, comprising means for transmitting, to a UE, configuration information scheduling one or more full-duplex communications and one or more half-duplex communications. A first unified TCI window corresponds to the one or more full-duplex communications. A second unified TCI window corresponds to the one or more half-duplex communications. The apparatus further includes means for performing full-duplex communications according to the first unified TCI window for a first time period having a first length. Additionally, the apparatus further includes means for performing half-duplex communications according to the second unified TCI window for a second time period having a second length.

Another example aspect includes a computer-readable medium (e.g., non-transitory computer-readable medium) storing instructions for wireless communication by a network node of a wireless communication network, executable by a processor, to transmit, to a UE, configuration information scheduling one or more full-duplex communications and one or more half-duplex communications. A first unified TCI window corresponds to the one or more full-duplex communications. A second unified TCI window corresponds to the one or more half-duplex communications. The instructions are further executable to perform full-duplex communications according to the first unified TCI window for a first time period having a first length. Additionally, the instructions are further executable to perform half-duplex communications according to the second unified TCI window for a second time period having a second length.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIG. 4A is a diagram illustrating a first example of full-duplex communications, in accordance with various aspects of the present disclosure.

FIG. 4B is a diagram illustrating a second example of full-duplex communications, in accordance with various aspects of the present disclosure.

FIG. 4C is a diagram illustrating a third example of full-duplex communications, in accordance with various aspects of the present disclosure.

FIG. 4D is a diagram illustrating full-duplex configurations of wireless devices, in accordance with various aspects of the present disclosure.

FIG. 14 is a flowchart of first additional or optional steps for the method of wireless communication by a base station of a wireless communication network, in accordance with various aspects of the present disclosure.

FIG. 15 is a flowchart of second additional or optional steps for the method of wireless communication by a base station of a wireless communication network, in accordance with various aspects of the present disclosure.

DETAILED DESCRIPTION

Figure 1:
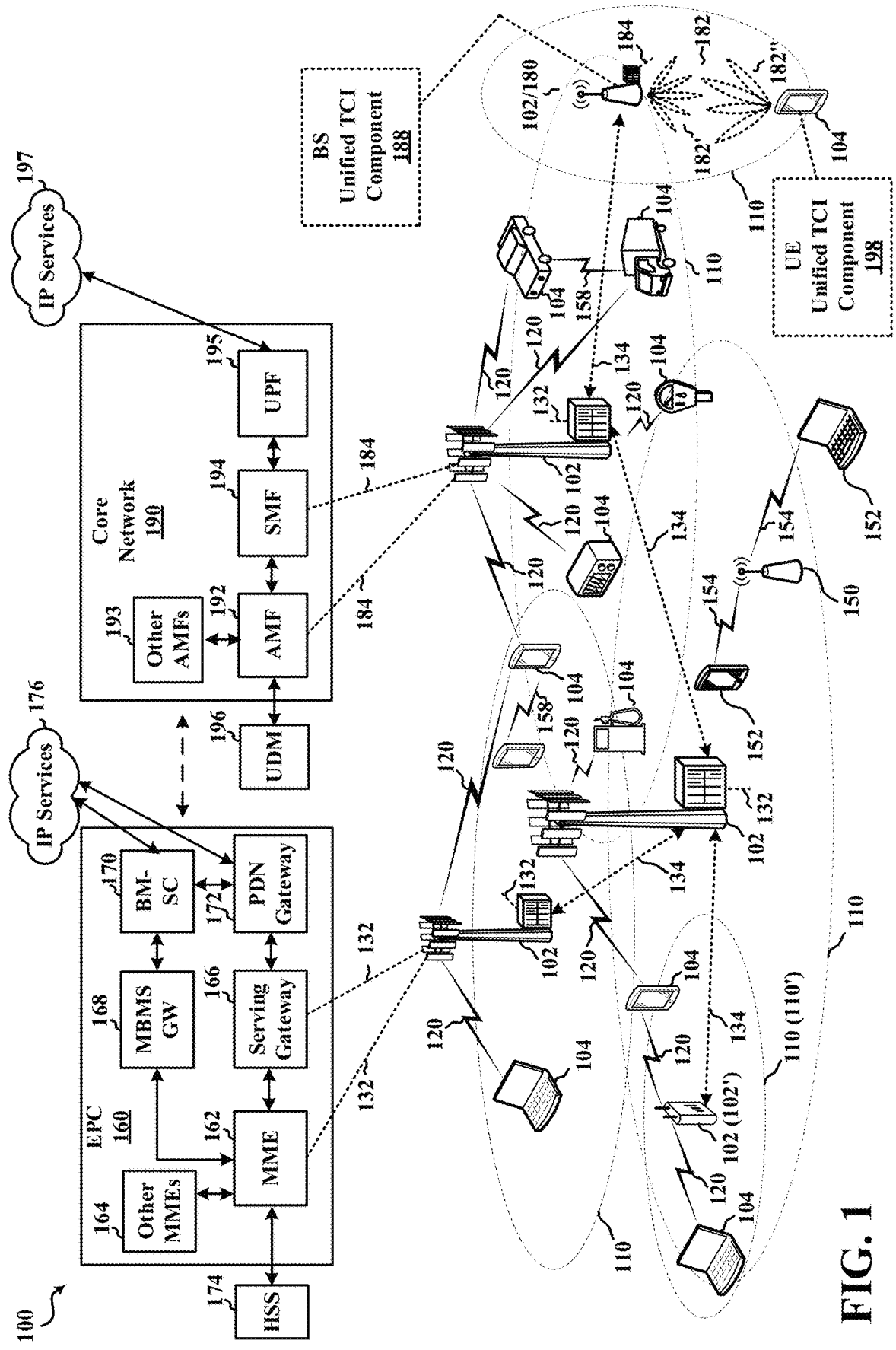
FIG. 1 is a diagram illustrating an example of a wireless communication system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communications systems may implement full-duplex communications. That is, one or more wireless devices (e.g., base station, user equipment (UE)) of the wireless communication system may simultaneously transmit and receive signals. For example, the wireless device may simultaneously perform downlink and uplink communications. However, conventional configuration procedures, such as the use of medium access control (MAC) control elements (MAC CE), may introduce activation latencies to apply the configurations and/or may require that the downlink and the uplink configurations be applied and/or activated separately. Further, in some aspects, the configurations may need to be applied for each scheduled communication. Thus, potentially increasing latency and complexity for the configuration of full-duplex communications.

Aspects presented herein provide for multiple manners for configuring and scheduling of full-duplex and half-duplex communications using unified TCI windows. The unified TCI windows may provide for the configuration of both the downlink and the uplink channels of a full-duplex communication. Alternatively or additionally, the unified TCI windows may provide for the configuration of both the downlink and the uplink channels of a half-duplex communication. In some aspects, a network device (e.g., base station) may transmit configuration information that may configure one or more UEs to perform the full-duplex and half-duplex communications using the unified TCI windows. Further, aspects presented herein may potentially reduce latency, increase spectrum efficiency, and increase resource utilization when compared to conventional wireless communication systems.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In some aspects, the base station 102 may include a base station (BS) unified transmission configuration indicator (TCI) component 188. The BS unified TCI component 188 may be configured to schedule full-duplex and half-duplex communications using unified TCI windows. For example, the BS unified TCI component 188 may transmit configuration information scheduling one or more full-duplex communications corresponding to a first unified TCI window and one or more half-duplex communications corresponding to a second unified TCI window.

Similarly, the UE 104 may include a UE unified TCI component 198. The UE unified TCI component 198 may be configured to perform full-duplex and half-duplex communications using unified TCI windows. For example, the UE unified TCI component 198 may receive configuration information scheduling one or more full-duplex communications corresponding to a first unified TCI window and one or more half-duplex communications corresponding to a second unified TCI window.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunication System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communication systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (186 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 to communicate with another UE 104, such as based on sidelink, V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through DCI, or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include minislots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. In such an example, the slot duration may be 0.25 milliseconds, the subcarrier spacing may be 60 kHz, and the symbol duration may be approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
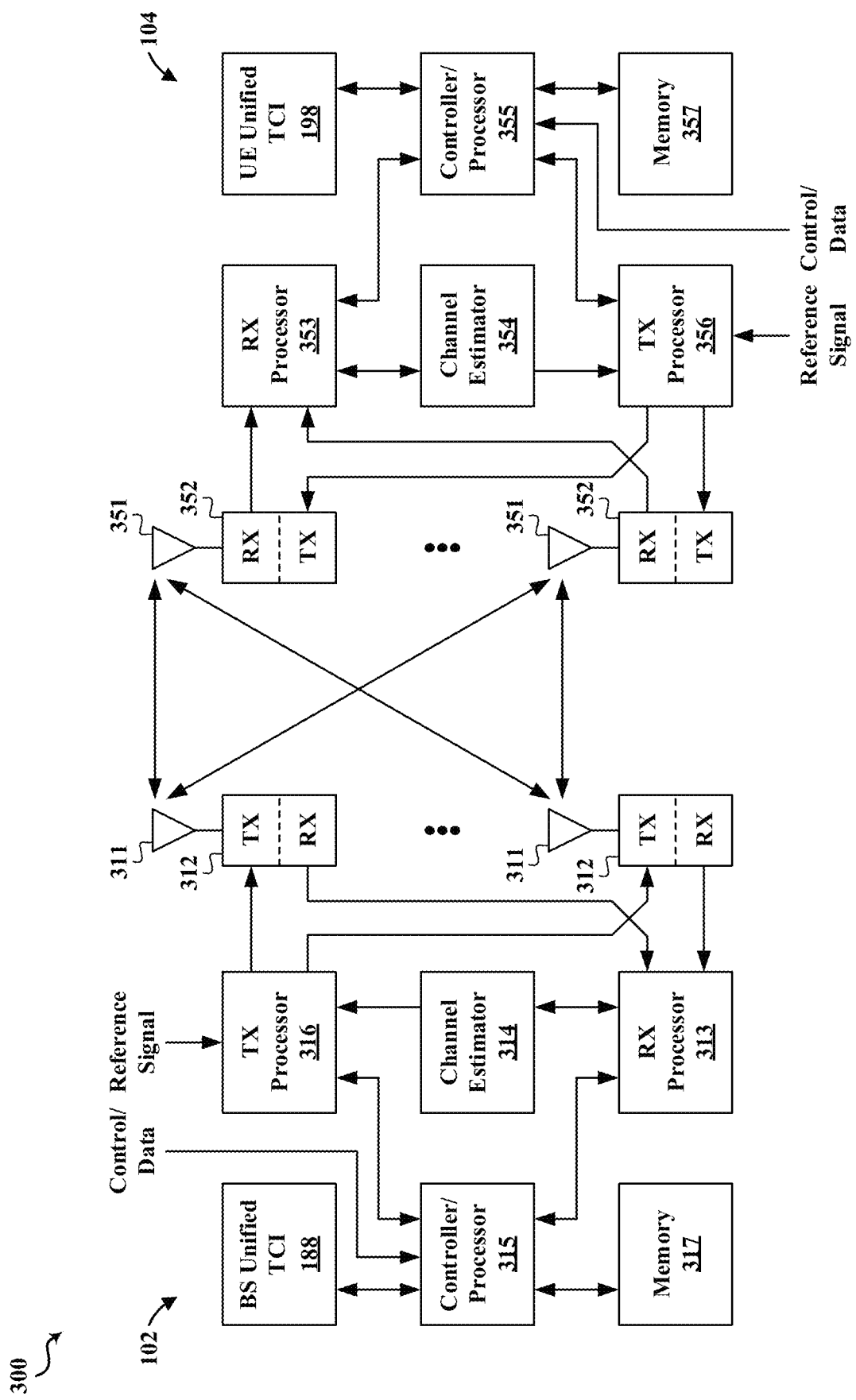
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in an access network 100. In the downlink, IP packets from the EPC 160 may be provided to a controller/processor 315. The controller/processor 315 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 315 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 313 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream may be spatially precoded to produce multiple spatial streams. Channel estimates from a channel estimator 314 may be used to determine the coding and modulation scheme, as well as for spatial processing. The channel estimate may be derived from a reference signal and/or channel condition feedback transmitted by the UE 104. Each spatial stream may then be provided to a different antenna 311 via a separate transmitter 312TX. Each transmitter 312TX may modulate an RF carrier with a respective spatial stream for transmission.

At the UE 104, each receiver 352RX may receive a signal through its respective antenna 351. Each receiver 352RX may recover information modulated onto an RF carrier and may provide the information to the receive (RX) processor 353. The TX processor 356 and the RX processor 353 may implement Layer 1 functionality associated with various signal processing functions. The RX processor 353 may perform spatial processing on the information to recover any spatial streams destined for the UE 104. If or when multiple spatial streams are destined for the UE 104, the multiple spatial streams may be combined by the RX processor 353 into a single OFDM symbol stream. The RX processor 353 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 354. The soft decisions may then be decoded and deinterleaved to recover the data and control signals that were originally transmitted by the base station 102 on the physical channel. The data and control signals may then be provided to the controller/processor 355, which may implement Layer 3 and Layer 2 functionality.

The controller/processor 355 can be associated with a memory 357 that stores program codes and data. The memory 357 may be referred to as a non-transitory computer-readable medium. The controller/processor 355 may provide demultiplexing between transport and logical channels, packet reassembly, deciphering, header decompression, and control signal processing to recover IP packets from the EPC 160. The controller/processor 355 is also responsible for error detection using an acknowledge (ACK) and/or negative acknowledge (NACK) protocol to support HARQ operations.

Similar to the functionality described in connection with the transmission by base station 102, the controller/processor 355 may provide RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 354 from a reference signal or feedback transmitted by the base station 102 may be used by the TX processor 356 to select the appropriate coding and modulation schemes, and to facilitate spatial processing. The spatial streams generated by the TX processor 356 may be provided to different antenna 351 via separate transmitters 352TX. Each transmitter 352TX may modulate an RF carrier with a respective spatial stream for transmission.

The uplink transmission may be processed at the base station 102 in a manner similar to that described in connection with the receiver function at the UE 104. Each receiver 312RX may receive a signal through its respective antenna 311. Each receiver 312RX may recover information modulated onto an RF carrier and may provide the information to a RX processor 313.

The controller/processor 315 may be associated with, and coupled with, a memory 317 that stores program codes and data. The memory 317 may be referred to as a non-transitory computer-readable medium. The controller/processor 315 may provide demultiplexing between transport and logical channels, packet reassembly, deciphering, header decompression, control signal processing to recover IP packets from the UE 104. IP packets from the controller/processor 315 may be provided to the EPC 160. The controller/processor 315 may also be responsible for error detection using an ACK and/or NACK protocol to support HARQ operations.

In some aspects, the base station 102 may include a BS unified TCI component 188. The BS unified TCI component 188 may be configured to schedule full-duplex and half-duplex communications using unified TCI windows. For example, the BS unified TCI component 188 may transmit configuration information scheduling one or more full-duplex communications corresponding to a first unified TCI window and one or more half-duplex communications corresponding to a second unified TCI window.

In other aspects, at least one of the TX processor 316, the RX processor 313, and the controller/processor 315 may be configured to perform aspects in connection with the BS unified TCI component 188 of FIG. 1. For example, the memory 317 may store computer-executable instructions defining the BS unified TCI component 188. In other aspects, the TX processor 316, the RX processor 313, and/or the controller/processor 315 may be configured to execute the BS unified TCI component 188.

In some aspects, the UE 104 may include a UE unified TCI component 198. The UE unified TCI component 198 may be configured to perform full-duplex and half-duplex communications using unified TCI windows. For example, the UE unified TCI component 198 may receive configuration information scheduling one or more full-duplex communications corresponding to a first unified TCI window and one or more half-duplex communications corresponding to a second unified TCI window.

In other aspects, at least one of the TX processor 356, the RX processor 353, and the controller/processor 355 may be configured to perform aspects in connection with the UE unified TCI component 198 of FIG. 1. For example, the memory 357 may store computer-executable instructions defining the UE unified TCI component 198. In other aspects, the TX processor 356, the RX processor 353, and/or the controller/processor 355 may be configured to execute the UE unified TCI component 198.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Wireless communication systems may implement full-duplex communications in addition to conventional half-duplex communications. That is, in some aspects, wireless devices of these wireless communication systems performing full-duplex communications may perform simultaneous (e.g., during at least a portion of a same time period) downlink and uplink communications (e.g., transmissions, receptions). For example, a network device (e.g., base station, gNodeB (gNB), transmit reception point (TRP)) may simultaneously receive uplink communications (e.g., from a UE) using a receive beam of an antenna panel (e.g., antenna array) of the network device and transmit downlink communications (e.g., to a UE) using a transmit beam of another antenna panel. In another example, a UE may simultaneously receive downlink communications (e.g., from a network device) using a receive beam of an antenna panel and transmit uplink communications (e.g., to a network device) using a transmit beam of another antenna panel. In other aspects, the network devices may utilize full-duplex communications to implement wireless backhaul links between network devices of an integrated access and backhaul (IAB) network. For example, the network devices may provide access to a core network via the wireless backhaul links of the IAB network. Alternatively or additionally, the wireless devices may perform half-duplex communications in which either downlink or uplink communications are performed consecutively in time.

In some aspects, a wireless device may use a beam pair (e.g., one transmit beam and one receive beam) to perform the full-duplex communications. That is, the transmit beam of the beam pair may simultaneously transmit an output signal as the receive beam of the beam pair may be receiving an input signal. Under certain channel conditions, a portion of the output signal may additionally be received by the receive beam. The portion of the output signal that is received by the receive beam may generally be referred to as self-interference. In some aspects, the self-interference may be caused by a portion of the transmit beam overlapping a portion of the receive beam. That is, in such aspects, a beam separation of the beam pair may not be sufficient to prevent self-interference. In other aspects, the self-interference may be caused by local coupling between the transmit antenna and the receive antenna of the wireless device. Alternatively or additionally, the self-interference may be caused by reflections of the transmitted output signal from objects (e.g., trees, buildings, vehicles, etc.) in the transmission environment. Such reflections may generally be referred to as clutter echo.

As a result, a full-duplex capability of a wireless device may be conditioned on and/or limited by several performance factors, such as beam separation, self-interference, clutter echo, and the like. For example, the beam pair used for the full-duplex communications may require that one or more performance factors meet corresponding predefined thresholds, and, as such, may provide sufficient performance for the full duplex communications. For example, the beam pair may need a beam separation that exceeds a minimum beam separation threshold. That is, if or when the beam separation of the beam pair does not exceed the minimum beam separation threshold, a resulting self-interference level may be such that the input signal may not be received and/or decoded successfully.

In another example, the beam pair may need a self-interference level that is lower than a maximum self-interference threshold. That is, if or when the self-interference level exceeds the maximum self-interference threshold, the input signal may not be received and/or decoded successfully. In another example, the beam pair may need a clutter echo interference level that is lower than a maximum clutter echo threshold. That is, if or when the clutter echo interference level exceeds the maximum clutter echo threshold, the input signal may not be received and/or decoded successfully.

Advantageously, full-duplex communications may reduce latency, increase spectrum efficiency, and increase resource utilization when compared to half-duplex communications.

Referring to FIGS. 4A-4D, the diagrams illustrate examples of different configurations that may be used for full-duplex communications between wireless devices of a wireless communication system. The wireless communication systems 400A-C (hereinafter "400") depicted in FIGS. 4A-4C, respectively, may be similar in many respects to the wireless communication system and the access network 100 described above with reference to FIG. 1 and may include additional features not mentioned above. Some of the elements of the wireless communication system and the access network 100 described above have been omitted for the sake of simplicity.

The network devices (e.g., 102, 102A, 102B, hereinafter "102") depicted in FIGS. 4A-4C may be similar in many respects to the network devices (e.g., base station 102, gNB 180, TRP 102/180) described above in reference to FIGS. 1 and 3, and may include additional features not mentioned above. The network devices 102 may comprise a BS unified TCI component 188 (shown in FIG. 1). The UEs (e.g., 104, 104A, 104B, hereinafter "104") depicted in FIGS. 4A-4C may be similar in many respects to the UE 104 described above in reference to FIGS. 1 and 3, and may include additional features not mentioned above. The UEs 104 may comprise a UE unified TCI component 198 (shown in FIG. 1).

FIG. 4A illustrates wireless communication system 400A with a first example configuration of full-duplex communications. For example, the UE 104 may be configured to perform full-duplex communications with a first network device 102A and a second network device 102B. That is, the UE 104 may be configured to simultaneously receive downlink transmissions from the first network device 102A and to transmit uplink transmissions to the network device 102B. For example, the UE 104 may simultaneously receive downlink transmissions from the first network device 102A using a receive beam of an antenna panel of the UE 104 and transmit uplink transmissions to the second network device 102B using a transmit beam of another antenna panel of the UE 104. Alternatively or additionally, the network device 102A and the network device 102B may be configured to perform half-duplex communications with the UE 104. That is, the network device 102A may transmit downlink transmissions to the UE 104 using a transmit beam of an antenna panel of the network device 102A, and the network device 102B may receive uplink transmissions from the UE 104 using a receive beam of an antenna panel of the network device 102B. Further, the half-duplex communications may not be simultaneous. For example, the downlink transmissions to the UE 104 and the uplink transmissions from the UE 104 may not overlap (e.g., occur during at least a portion of a same time period).

FIG. 4B illustrates wireless communication system 400B with a second example configuration of full-duplex communications. For example, the network device 102 may be configured to perform full-duplex communications with a first UE 104A and a second UE 104B. That is, the network device 102 may be configured to simultaneously transmit downlink transmissions to the first UE 104A and to receive uplink transmissions from the second UE 104B. For example, the network device 102 may simultaneously transmit downlink transmissions to the first UE 104A using a transmit beam of an antenna panel of the network device 102 and receive uplink transmissions from the second UE 104B using a receive beam of another antenna panel of the network device 102. Alternatively or additionally, the UE 104A and the UE 104B may be configured to perform half-duplex communications with the network device 102. That is, the UE 104A may receive downlink transmissions from the network device 102 using a receive beam of an antenna panel of the UE 104A, and the UE 104B may transmit uplink transmissions to the network device 102 using a transmit beam of an antenna panel of the UE 104B. Further, the half-duplex communications may not be simultaneous. For example, the downlink transmissions from the network device 102 and the uplink transmissions to the network device 102 may not overlap (e.g., occur during at least a portion of a same time period).

FIG. 4C illustrates wireless communication system 400C with a third example configuration of full-duplex communications. For example, the network device 102 may be configured to perform full-duplex communications with a UE 104. That is, the network device 102 may be configured to simultaneously transmit downlink transmissions to the UE 104 and to receive uplink transmissions from the UE 104. For example, the network device 102 may simultaneously transmit downlink transmissions to the UE 104 using a transmit beam of an antenna panel of the network device 102 and receive uplink transmissions from the UE 104 using a receive beam of another antenna panel of the network device 102. Alternatively or additionally, the UE 104 may simultaneously receive downlink transmissions from the network device 102 using a receive beam of an antenna panel of the UE 104 and transmit uplink transmissions to the second network device 102B using a transmit beam of another antenna panel of the UE 104. That is, the downlink transmissions from the network device 102 uplink transmissions to the second network device 102B may occur during at least a portion of a same time period.

FIG. 4D is a diagram 450 illustrating full-duplex configurations for the wireless devices of the wireless communication systems 400 as described above in reference to FIGS. 4A-4C. For example, a wireless communication system 400 may operate in a baseline (e.g., half-duplex) mode if or when the full-duplex (FD) mode of the network devices 102 is disabled and the full-duplex mode of the UEs 104 is disabled. That is, in such a baseline mode, the network devices 102 and the UEs 104 operate in half-duplex modes. In another example, that may be generally referred to as use case 1, the full-duplex mode of the network devices 102 is disabled and the full-duplex mode of the UEs 104 is enabled, as described above in reference to FIG. 4A. In another example, that may be generally referred to as use case 2, the full-duplex mode of the network devices 102 is enabled and the full-duplex mode of the UEs 104 is disabled, as described above in reference to FIG. 4B. In another example, that may be generally referred to as use case 1, the full-duplex mode of the network devices 102 is enabled and the full-duplex mode of the UEs 104 is enabled, as described above in reference to FIG. 4C.

It may be understood that the wireless communication systems 400 depicted in FIGS. 4A-4C are only three examples of wireless communication systems that may be utilized without departing from the scope described herein. For example, other network topologies comprising different amounts and/or configurations of network devices 102 and/ or UEs 104 may be utilized.

Figure 5:
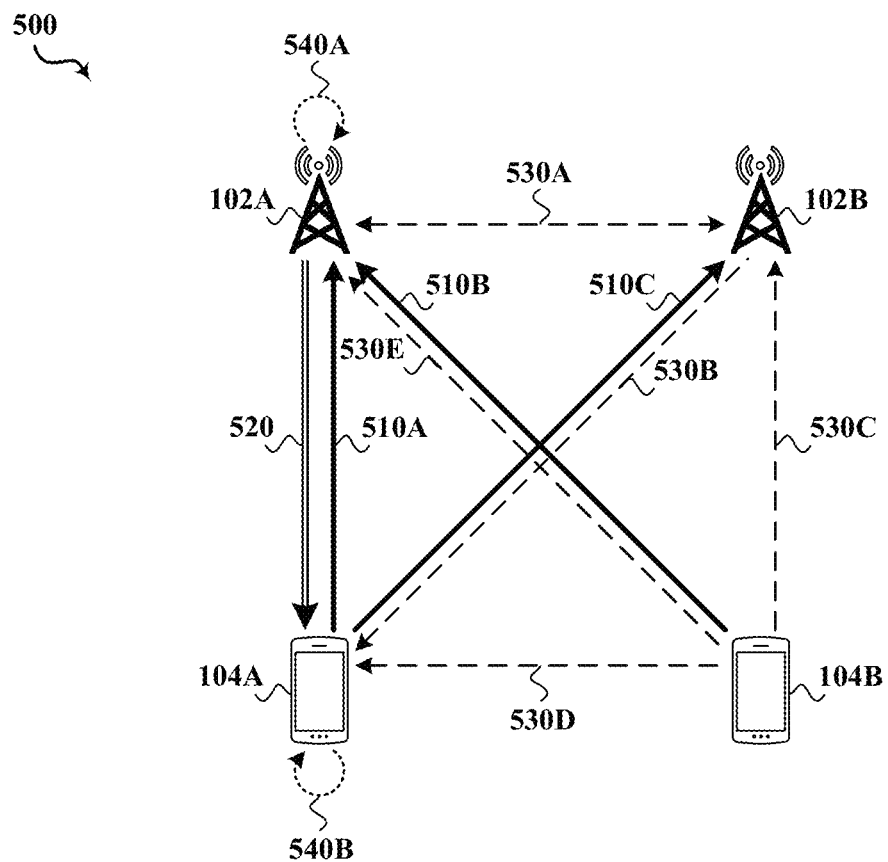
FIG. 5 is a diagram illustrating an example of a full-duplex wireless communication system, in accordance with various aspects of the present disclosure.

FIG. 5 illustrates an example of a full-duplex wireless communication system 500. The full-duplex wireless communication system 500 may comprise network devices 102A, 102B (hereinafter "102") and UEs 104A, 104B (hereinafter "104"). The full-duplex wireless communication system 500 may be similar in many respects to the wireless communication system and the access network 100 described above with reference to FIG. 1 and to the wireless communication systems 400 described above with reference to FIGS. 4A-4C and may include additional features not mentioned above. Some of the elements of the wireless communication systems described above have been omitted for the sake of simplicity.

The network devices 102 depicted in FIG. 5 may be similar in many respects to the network device (e.g., base station 102, gNB 180, TRP 102/180) described above in reference to FIGS. 1, 3, and 4A-4D, and may include additional features not mentioned above. The network devices 102 may comprise a BS unified TCI component 188 (shown in FIG. 1). The UEs depicted in FIG. 5 may be similar in many respects to the UE 104 described above in reference to FIGS. 1, 3, and 4A-4D, and may include additional features not mentioned above. The UEs 104 may comprise a UE unified TCI component 198 (shown in FIG. 1).

In some aspects, the UE 104A may be configured to operate in full-duplex mode (e.g., full-duplex mode is enabled) and the network devices 102 may be configured to operate in half-duplex mode (e.g., full-duplex mode is disabled), as described above in reference to FIG. 4A. That is, the UE 104A may be configured to simultaneously receive downlink transmissions 520 from the network device 102A and transmit uplink transmissions 510C to the network device 102B. As shown in FIG. 5, the UE 104A may receive, in combination with the downlink transmissions 520, self-interference 540B from the uplink (transmit) beam transmitting the uplink transmissions 510C and/or interference from other wireless devices, such as cross-link interference 530D from the UE 104B. That is, under certain channel conditions, the UE 104A may receive, as interference, other transmissions from other wireless devices. Alternatively or additionally, the network device 102B may receive, in combination with the uplink transmissions 510C, the cross-link interference 530A from the network device 102A and/or the cross-link interference 530C from the UE 104B.

In other aspects, the network device 102A may be configured to operate in full-duplex mode (e.g., full-duplex mode is enabled) and the UEs 104 may be configured to operate in half-duplex mode (e.g., full-duplex mode is disabled), as described above in reference to FIG. 4B. That is, the network device 102A may be configured to simultaneously receive the uplink transmissions 510B from the UE 104B and transmit the downlink transmissions 520 to the UE 104A. As shown in FIG. 5, the network device 102A may receive, in combination with the uplink transmissions 510B, the self-interference 540A and/or interference from other wireless devices, such as the cross-link interference 530A from the network device 102B. Alternatively or additionally, the UE 104A may receive, in combination with the downlink transmissions 520, the cross-link interference 530B from the network device 102B and/or the cross-link interference 530D from the UE 104B.

In other aspects, the network device 102A may be configured to operate in full-duplex mode (e.g., full-duplex mode is enabled) and the UE 104A may be configured to operate in full-duplex mode (e.g., full-duplex mode is enabled), as described above in reference to FIG. 4C. That is, the network device 102A may be configured to simultaneously receive the uplink transmissions 510A from the UE 104A and transmit the downlink transmissions 520 to the UE 104A. As shown in FIG. 5, the network device 102A may receive, in combination with the uplink transmissions 510A, the self-interference 540A and/or interference from other wireless devices, such as the cross-link interference 530A from the network device 102B and/or the cross-link interference 530E from the UE 104B. Alternatively or additionally, the UE 104A may receive, in combination with the downlink transmissions 520, the self-interference 540B and/or interference from other wireless devices, such the cross-link interference 530B from the network device 102B and/or the cross-link interference 530D from the UE 104B.

It may be understood that the full-duplex wireless communication system 500 depicted in FIG. 5 is only an example of a wireless communication systems that may be utilized without departing from the scope described herein. For example, other network topologies comprising different amounts and/or configurations of network devices 102 and/or UEs 104 may be utilized.

Wireless communication systems (e.g., wireless communication system 100 of FIG. 1, wireless communication systems 400 of FIGS. 4A-4C, full-duplex wireless communication system 500 of FIG. 5 may use medium access control (MAC) layer functionality, such as MAC control elements (MAC CE), to configure wireless devices (e.g., UEs 104) to switch between downlink and uplink channels and/or beams. For example, MAC CEs may be used to switch between a physical downlink control channel (PDCCH) and a physical uplink control channel (PUCCH) beam, to activate physical downlink shared channel (PDSCH) beams, and/or to activate a path loss reference signal (RS) for a physical uplink shared channel (PUSCH) and/or a sounding reference signal (SRS). However, the use of a MAC CE to perform these operations may introduce an activation latency (e.g., 3 milliseconds (msec)) for the UE to apply the activation command. In addition, the downlink beam and the uplink beam may need to be indicated and/or activated separately, and, as such, potentially increasing the activation latency introduced by the MAC CE-based operations.

Two antenna ports may be said to be quasi co-located if or when properties of a channel over which a symbol on one antenna port is conveyed may be inferred from another channel over which a symbol on the other antenna port is conveyed. As such, a quasi co-location (QCL) indication may define a relationship between two reference signals at a receiver of the UE 104. For example, a set of QCL rules may indicate to the UE 104 properties, such as a Doppler shift, a Doppler spread, an average delay, a delay spread, a spatial Rx parameter, that may be shared between pairs of reference signals.

In some aspects, a network device (e.g., base station 102, gNB 180, TRP 102/180) may transmit, to a UE 104, one or more transmission configuration indicator (TCI) states indicating reference signal pairs for QCL. That is, the TCI states may describe which reference signals may be used as a QCL source, and which QCL properties may be derived from each reference signal. Alternatively or additionally, the TCI state may establish a QCL relationship between one or more target reference signals and a source reference signal.

In other aspects, the network device 102 may transmit, to the UE 104, one or more joint downlink/uplink common TCI states for half-duplex communications. The joint downlink/uplink common TCI states may indicate a common beam for at least one downlink channel/reference signal and at least one uplink channel/reference signal. That is, the joint downlink/uplink common TCI state may indicate a common beam for receiving one or more downlink channels/reference signals or for transmitting one or more uplink channels/reference signals. For example, the downlink channels and/or downlink reference signals may correspond to PDCCH, PDSCH, channel state information reference signal (CSI-RS), and/or positioning reference signal (PRS). In another example, the uplink channels and/or uplink reference signals may correspond to PUCCH, PUSCH, physical random access channel (PRACH), and/or SRS.

Alternatively or additionally, the network device 102 may transmit, to the UE 104, one or more separate common TCI states for half-duplex communications. Each separate common TCI state may indicate a common beam for at least two downlink channels/reference signals or at least two uplink channels/reference signals. That is, a separate downlink common TCI state may indicate a common beam for receiving at least two downlink channels/reference signals. Further, a separate uplink common TCI state may indicate a common beam for transmitting at least two uplink channels/reference signals.

In other aspects, the network device 102 may transmit, to the UE 104, a message (e.g., downlink control information (DCI)) that may trigger activation of one or more joint downlink/uplink common TCI states and/or one or more separate common TCI states. That is, the UE 104 may, in response to receiving a TCI activation message, activate the one or more joint downlink/uplink common TCI states and/or the one or more separate common TCI states indicated by the TCI activation message.

Aspects presented herein provide for multiple manners to schedule full-duplex and half-duplex communications using unified TCI windows. The unified TCI windows may correspond to a common full-duplex TCI state for full-duplex communications and/or a joint common TCI state for half-duplex communications. For example, a unified TCI window comprising full-duplex communications may correspond to a common full-duplex TCI state for full-duplex communications. The common full-duplex TCI state may comprise a single bi-directional (e.g., include a downlink RS and an uplink RS) TCI state corresponding to one or more downlink channels/reference signals and one or more uplink channels/reference signals for a downlink/uplink beam pair with which the full-duplex communications may be performed. Alternatively or additionally, the common full-duplex TCI state may comprise a downlink TCI state corresponding to one or more downlink channels/reference signals for a downlink beam of a downlink/uplink beam pair and an uplink TCI state corresponding to one or more uplink channels/reference signals for an uplink beam of the downlink/uplink beam pair with which the full-duplex communications may be performed.

In another example, a unified TCI window comprising half-duplex communications may correspond to a joint common TCI state for half-duplex communications. The joint common TCI state may comprise a joint downlink/uplink common TCI state indicating a common beam for one or more downlink channels/reference signals and one or more uplink channels/reference signals of the half-duplex communications.

Figure 6:
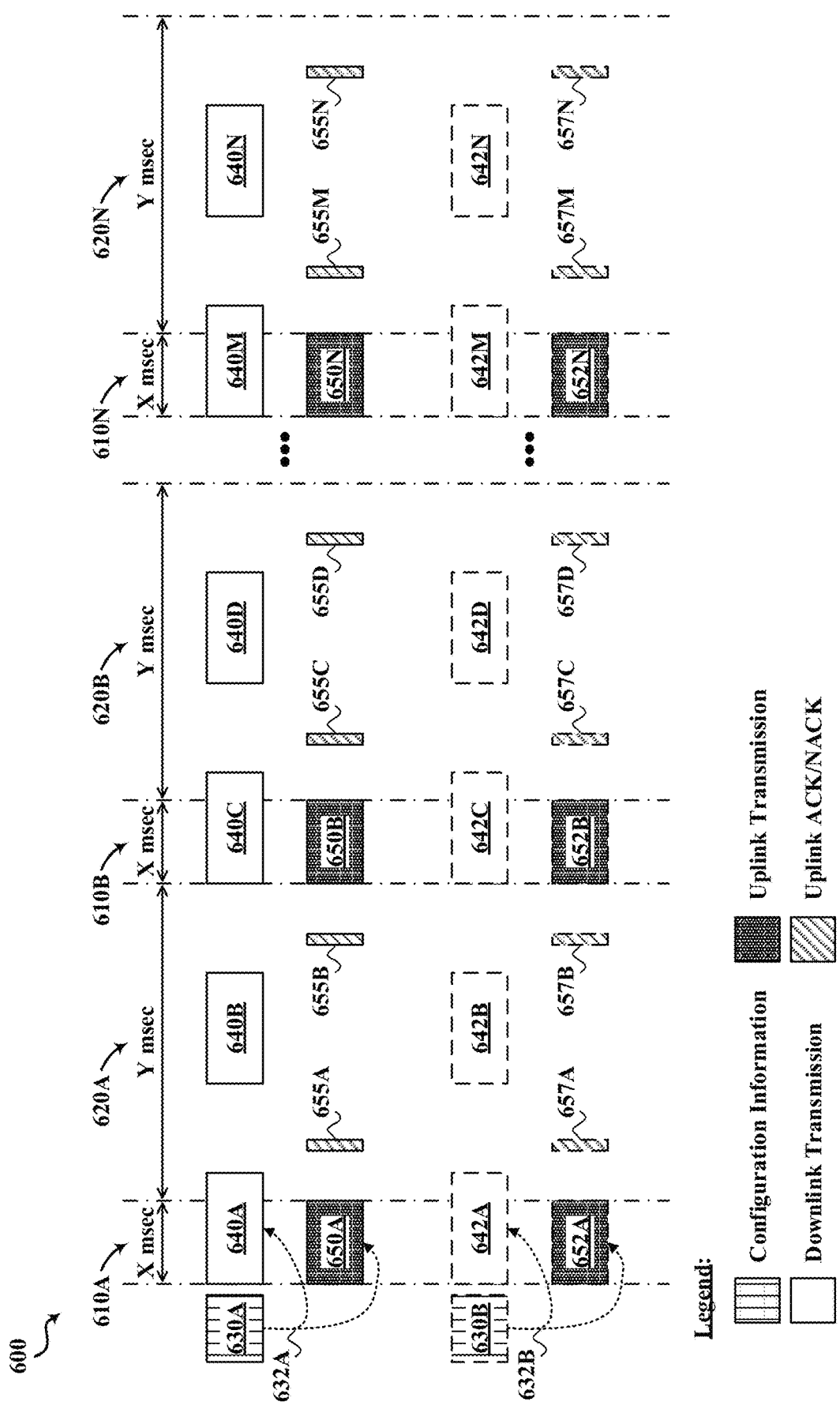
FIG. 6 is a diagram illustrating an example of unified transmission configuration indicator (TCI) windows for full-duplex and half-duplex scheduling, in accordance with various aspects of the present disclosure.

FIG. 6 illustrates a diagram 600 of an scheduling example of full-duplex communications and half-duplex communications using unified TCI windows. The scheduling example depicted in FIG. 6 may be implemented by a full-duplex wireless communication system, such as the wireless communication system and the access network 100 of FIG. 1, the wireless communication systems 400 of FIGS. 4A-4C, and/or the full-duplex wireless communication system of FIG. 5.

In some aspects, a network device (e.g., base station 102, gNB 180, TRP 102/180 as shown in FIG. 1) may be configured to transmit configuration information 630A, 630B (hereinafter "630") to one or more UEs (e.g., UE 104 of FIG. 1). The configuration information 630 may schedule one or more full-duplex unified TCI windows 610A-610N (hereinafter "610") comprising overlapped downlink transmissions and uplink transmissions. That is, the downlink transmissions and the uplink transmissions occurring during the full-duplex unified TCI windows 610 may be performed simultaneously. Alternatively or additionally, the configuration information 630 may schedule one or more half-duplex unified TCI windows 620A-620N (hereinafter "620") comprising non-overlapped downlink transmissions and/or uplink transmissions. That is the downlink transmissions and the uplink transmissions occurring during the half-duplex unified TCI windows 620 may not be performed simultaneously.

In other aspects, the full-duplex unified TCI windows 610 may correspond to a common full-duplex TCI state for full-duplex communications and the half-duplex unified TCI windows 620 may correspond to a joint common TCI state for half-duplex communications, as described above in reference to FIG. 5. For example, the full-duplex unified TCI windows 610 may correspond to a common full-duplex TCI state for full-duplex communications comprising a single bi-directional TCI state and/or a downlink TCI state and an uplink TCI state for the downlink/uplink beam pair with which the full-duplex communications may be performed. Alternatively or additionally, the half-duplex unified TCI windows 620 may correspond to a joint common TCI state for half-duplex communications. For example, the joint common TCI state may comprise a joint downlink/uplink common TCI state and/or a separate downlink common TCI state and a separate uplink common TCI state corresponding to a common beam for performing the half-duplex communications.

In some aspects, the configuration information 630 may indicate a time duration (e.g., X msec) for the full-duplex unified TCI windows 610, such as 20 milliseconds. Alternatively or additionally, the configuration information 630 may indicate a time duration (e.g., Y msec) for the half-duplex unified TCI windows 620, such as 40 milliseconds. In other aspects, the configuration information 630 may indicate a periodicity for the full-duplex unified TCI windows 610 and the half-duplex unified TCI windows 620. That is, the configuration information 630 may indicate a unified TCI window pattern that may repeat at the indicated periodicity. For example, the configuration information 630 may indicate that the full-duplex unified TCI windows 610 and the half-duplex unified TCI windows 620 repeat every 60 msec.

In other aspects, the configuration information 630 may only indicate the time duration for the half-duplex unified TCI windows 620 and the periodicity. That is, the configuration information 630 may omit indicating the time duration of the full-duplex unified TCI windows 610. If or when the configuration information 630 omits indicating the time duration of the full-duplex unified TCI windows 610, the time duration of the full-duplex unified TCI windows 610 may be determined according to the time duration of the half-duplex unified TCI windows 620 and the periodicity indicated by the configuration information 630. Alternatively or additionally, the configuration information 630 may only indicate the time duration for the full-duplex unified TCI windows 610 and the periodicity. That is, the configuration information 630 may omit indicating the time duration of the half-duplex unified TCI windows 620. If or when the configuration information 630 omits indicating the time duration of the half-duplex unified TCI windows 620, the time duration of the half-duplex unified TCI windows 620 may be determined according to the time duration of the full-duplex unified TCI windows 610 and the periodicity indicated by the configuration information 630.

In other aspects, the configuration information 630 may indicate that the unified TCI windows repeat for a particular unified TCI duration limit (e.g., 200 msec). That is, the pattern of unified TCI windows (e.g., 610, 620) may repeat, according to the indicated periodicity, for example, until the unified TCI duration has elapsed. For example, the network device 102 and the UEs 104 may stop performing the full-duplex communications according to the full-duplex unified TCI windows 610 and/or stop performing the half-duplex communications according to the half-duplex unified TCI windows 620 if or when the unified TCI duration limit has been reached.

In some aspects, the network device 102 may dynamically transmit the configuration information 630. For example, the network device 102 may transmit the configuration information 630 using downlink control information (DCI) messaging. Alternatively or additionally, the network device 102 may transmit the configuration information 630 in a semi-static and/or a static manner. For example, the network device 102 may transmit the configuration information 630 using radio resource control (RRC) signaling.

In other aspects, the configuration information 630A may schedule one or more downlink transmissions 640A-640N (hereinafter "640") and/or the configuration information 630B may schedule one or more downlink transmissions 642A-642N (hereinafter "642") and 655A-655N (hereinafter "655"). Alternatively or additionally, the configuration information 630A may schedule one or more uplink transmissions 650A-650N (hereinafter "650") and/or the configuration information 630B may schedule one or more uplink transmissions 652A-652N (hereinafter "650") and 657A-657N (hereinafter "657"). In such aspects, the one or more full-duplex unified TCI windows 610 may be indicated by the one or more time periods during which the one or more downlink transmissions (e.g., 640, 642) overlap with the one or more uplink transmissions (e.g., 650, 655, 652, 657). Alternatively or additionally, the one or more half-duplex unified TCI windows 620 may be indicated by the one or more time periods during which the one or more downlink transmissions (e.g., 640, 642) do not overlap with the one or more uplink transmissions (e.g., 650, 652).

In some aspects, the one or more downlink transmissions 640 and the one or more uplink transmissions 650, 655 may be performed using a first component carrier (e.g., primary cell). Alternatively or additionally, the one or more downlink transmissions 642 and the one or more uplink transmissions 652, 657 may be performed using a second component carrier (e.g., secondary cell). In other aspects, the one or more downlink transmissions 640 and the one or more uplink transmissions 652, 657 may be performed using the first component carrier. Alternatively or additionally, the one or more downlink transmissions 642 and the one or more uplink transmissions 650, 655 may be performed using the second component carrier.

In some aspects, the configuration information 630 may trigger activation (e.g., 632A, 632B) of the common full-duplex TCI state and/or the joint common TCI state corresponding to the one or more full-duplex unified TCI windows 610 and to the one or more half-duplex unified TCI windows 620, respectively. Alternatively or additionally, the network device 102 may transmit an additional message that may trigger activation of the unified TCI states. That is, the UEs 104 may, in response to the activations, activate the unified TCI states corresponding to the unified TCI windows configured by the configuration information 630.

In other aspects, the network device 102 may transmit, to the UE 104, a message (e.g., downlink control information (DCI)) that may trigger activation of one or more joint downlink/uplink common TCI states and/or one or more separate common TCI states. That is, the UE 104 may, in response to receiving a TCI activation message, activate the one or more joint downlink/uplink common TCI states and/or the one or more separate common TCI states indicated by the TCI activation message.

Continuing to refer to FIG. 6, the unified TCI state corresponding to each unified TCI window may apply to all communications performed during the duration of the unified TCI window. For example, the common full-duplex TCI state, that corresponds to the full-duplex unified TCI window 610, may be applied to the downlink channels of the full-duplex communications performed during the duration of the full-duplex unified TCI window 610. Alternatively or additionally, the common full-duplex TCI state may be applied to the uplink channels of the full-duplex communications performed during the duration of the full-duplex unified TCI window 610. In another example, the joint common TCI state, that corresponds to the half-duplex unified TCI window 620, may be applied to the downlink channels of the half-duplex communications performed during the duration of the half-duplex unified TCI window 620. Alternatively or additionally, the joint common TCI state may be applied to the uplink channels of the half-duplex communications performed during the duration of the half-duplex unified TCI window 620.

In some aspects, the one or more downlink transmissions 640, 642 may comprise downlink transmissions of periodic (e.g., semi-persistent) signals and/or aperiodic signals (e.g., dynamically allocated). For example, the downlink transmissions 640, 642 may comprise one or more of PDCCH, PDSCH, CSI-RS, and/or PRS. Alternatively or additionally, the one or more uplink transmissions 650, 652, 655, 657 may comprise uplink transmissions of periodic signals and/or aperiodic signals. For example, the one or more uplink transmissions 650, 652, 655, 657 may comprise one or more of PUCCH, PUSCH, PRACH, SRS, ACK/NACK.

In some aspects, the network device 102 may only transmit, within each unified TCI window 610, 620, a same unified TCI state as the unified TCI state corresponding to the unified TCI window 610, 620. That is, the network device 102 may be prevented from transmitting additional configuration information indicating a new TCI state corresponding to a currently active unified TCI window 610, 620 that differs from the unified TCI state that corresponds to the currently active unified TCI window 610, 620. For example, such a restriction may be in conformance with one or more regulations and/or standards (e.g., 3GPP standards). In such aspects, the network device 102 and the UEs 104 may continue to perform communications (e.g., full-duplex, half-duplex) in accordance with the unified TCI state that corresponds to the currently active unified TCI window 610, 620.

In other aspects, the network device 102 may transmit, within a particular TCI window 610, 620, additional configuration information indicating a new TCI state that may differ from the unified TCI state that corresponds to the particular unified TCI window 610, 620. In some aspects, the UEs 104 may discard the additional configuration information indicating the new TCI state, and, as such, may continue to perform communications (e.g., full-duplex, half-duplex) in accordance with the unified TCI state that corresponds to the particular unified TCI window 610, 620. Alternatively or additionally, the UEs 104 may switch to the new TCI state, and, as such, may perform additional communications using the new TCI state.

In some aspects, the unified TCI windows 610, 620 may be implicitly configured according to a predefined rule. For example, the predefined rule may indicate to select a corresponding full-duplex unified TCI window 610 for one or more time periods comprising full-duplex communications as scheduled by the configuration information 630. That is, the predefined rule may indicate to apply a common full-duplex TCI state to the full-duplex communications scheduled by the configuration information 630. Alternatively or additionally, the predefined rule may indicate to select a corresponding half-duplex unified TCI window 610 for one or more time periods comprising half-duplex communications as scheduled by the configuration information 630. That is, the predefined rule may indicate to apply a joint common TCI state to the half-duplex communications scheduled by the configuration information 630. In some aspects, the predefined rule may be in accordance with one or more regulations and/or standards (e.g., 3GPP standards).

In other aspects, the predefined rule may define a gap duration prior to switching from performing the half-duplex communications to performing the full-duplex communications. The gap duration may provide the UEs 104 with time to effect the configuration switch. For example, the UEs 104 may, during the gap duration, switch from one unified TCI state to another, change configuration of one or more amplifiers (e.g., power amplifiers, low-noise amplifiers), and the like. In some aspects, the predefined rule may only define the gap duration for uplink channels. That is, the predefined rule may not define a gap duration for downlink channels.

In some aspects, the unified TCI windows 610, 620 may be explicitly configured according to configuration information 630. For example, the network device 102 may transmit, via RRC signaling, the configuration information 630 indicating a unified TCI window pattern within a unified TCI duration limit. That is, the unified TCI window pattern may assign a portion of the unified TCI duration limit to one or more full-duplex unified TCI windows 610. For example, the common full-duplex TCI state may be applied to the portion of the unified TCI duration limit corresponding to one or more full-duplex unified TCI windows 610. Alternatively or additionally, the remaining portion of the unified TCI duration limit may be implicitly assigned to one or more half-duplex unified TCI windows 620 and/or the joint common TCI state may applied to the remaining portion of the unified TCI duration limit.

In other aspects, the unified TCI window pattern may explicitly assign the remaining portion of the unified TCI duration limit to the one or more half-duplex unified TCI windows 620. In other aspects, the unified TCI window pattern may define the gap duration for switching from the half-duplex communications to the full-duplex communications, as described above.

In other aspects, the unified TCI window pattern may correspond to periodic (e.g., semi-persistent) communications and/or aperiodic (e.g., dynamically scheduled) communications. For example, the unified TCI window pattern may comprise downlink and/or uplink communications that may be periodically scheduled, and, as such, may result in periodically scheduled unified TCI windows 610, 620. Alternatively or additionally, the unified TCI window pattern may comprise dynamically scheduled downlink and/or uplink communications that may be aperiodic, and, as such, may result in unified TCI windows 610, 620 may not follow a periodic (e.g., cyclic) pattern.

In other aspects, a reference (start) time for the unified TCI window pattern may be selected according to a predefined rule and/or may be selected according to an explicit indication in the configuration information 630. That is, a start time of the unified TCI window pattern may be selected according to a transmission end time of the configuration information, a transmission end time of an acknowledgement (ACK) of the configuration information 630, and/or a first scheduled downlink and/or uplink communication of the unified TCI window pattern, as indicated by a predefined rule. That is, the predefined rule may indicate a timing offset from the transmission of a last transmitted symbol of the configuration information 630 to the start of the unified TCI window pattern. Alternatively or additionally, the predefined rule may indicate a timing offset from the transmission of a last transmitted symbol of the ACK of the configuration information 630 to the start of the unified TCI window pattern. In another example, the predefined rule may indicate a timing offset from the transmission of a first transmitted symbol of the first scheduled (downlink and/or uplink) transmission of the unified TCI window pattern to the start of the unified TCI window pattern.

In other aspects, the start time of the unified TCI window pattern may be selected according to an explicit indication comprised by the configuration information 630. For example, the configuration information 630 may comprise a timing offset and/or a time reference to start the unified TCI window pattern.

It may be understood that the scheduling example depicted in FIG. 6 is only one example of a unified TCI window configuration that may be utilized without departing from the scope described herein. For example, other unified TCI window configurations comprising different communication scheduling and/or signaling may be utilized.

Advantageously, the unified TCI windows described above provide for joint configuration of downlink channels and/or beams and uplink channels and/or beams for full-duplex communications and half-duplex communications without introducing an activation latency to apply an activation command. Thus, aspects presented herein may potentially reduce latency, increase spectrum efficiency, and increase resource utilization when compared to conventional wireless communication systems.

Figure 7:
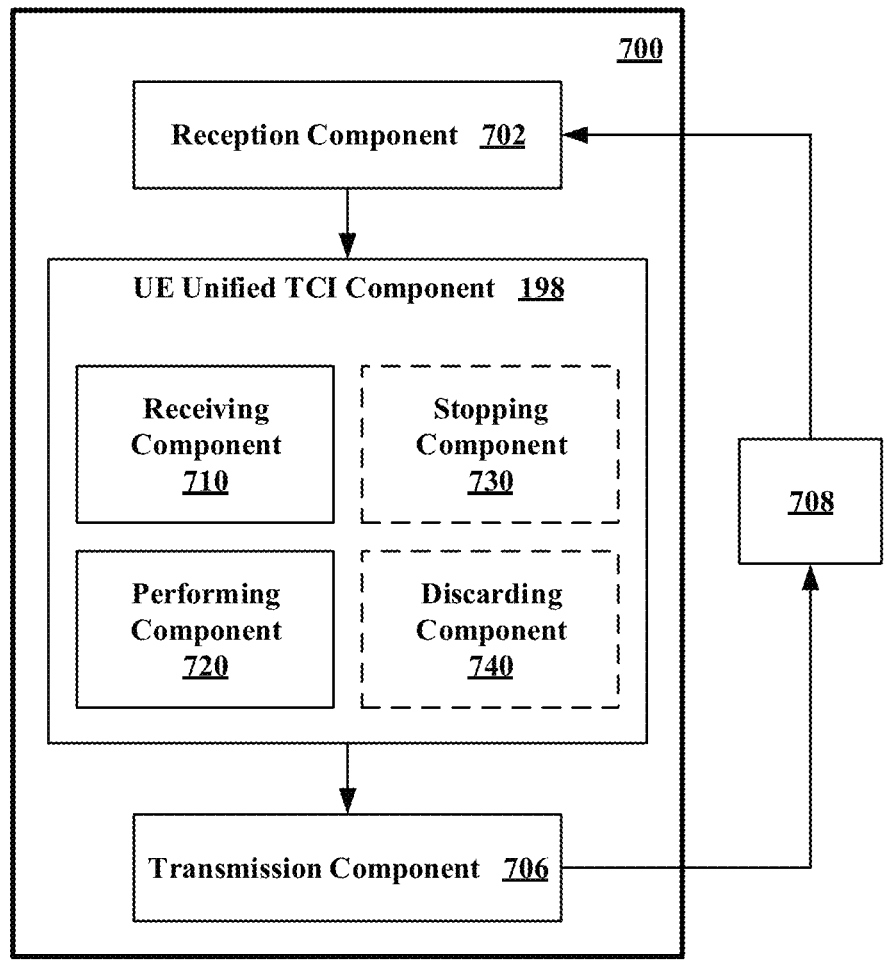
FIG. 7 is a diagram illustrating an example apparatus, such as a user equipment (UE), for wireless communication in a wireless communication network, in accordance with various aspects of the present disclosure.

FIG. 7 is a block diagram of an example apparatus 700 for wireless communication by a UE of a wireless communication network. The apparatus 700 may be a UE 104 (e.g., UE 104 of FIGS. 1 and 3-6) or a UE 104 may include the apparatus 700. In some aspects, the apparatus 700 may include a reception component 702 configured to receive wireless communications from another apparatus (e.g., apparatus 708), a UE unified TCI component 198 configured to perform full-duplex and half-duplex communications using unified TCI windows, and which may be in communication with one another (e.g., via buses or electrical connections). As shown, the apparatus 700 may be in communication with another apparatus 708 (such as a base station 102, or another wireless communication device) using the reception component 702 and the transmission component 706.

In some aspects, the apparatus 700 may be configured to perform one or more operations described herein in connection with FIGS. 1 and 3-6. Alternatively or additionally, the apparatus 700 may be configured to perform one or more processes described herein, such as method 800 of FIGS. 8-11. In some aspects, the apparatus 700 may include one or more components of the UE 104 described above in connection with FIGS. 1 and 3-6.

The reception component 702 may receive communications, such as reference signals, control information, data communications, or a combination thereof, from the apparatus 708. The reception component 702 may provide received communications to one or more other components of the apparatus 700, such as the UE unified TCI component 198. In some aspects, the reception component 702 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the UE 104 described above in connection with FIGS. 1 and 3-6.

The transmission component 706 may transmit communications, such as reference signals, control information, data communications, or a combination thereof, to the apparatus 708. In some aspects, the UE unified TCI component 198 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In other aspects, the transmission component 706 may include one or more antennas, a modulator, a transmit MIMO processor, a transmit processor, a controller/processor, a memory, or a combination thereof, of the UE 104 described above in connection with FIGS. 1 and 3-6. In some aspects, the transmission component 706 may be co-located with the reception component 702 in a transceiver or transceiver component.

The UE unified TCI component 198 may be configured to perform full-duplex and half-duplex communications using unified TCI windows. In some aspects, the UE unified TCI component 198 may include a set of components, such as a receiving component 710 and a performing component 720. The receiving component 710 may be configured to receive, from an apparatus 708, configuration information scheduling one or more full-duplex communications and one or more half-duplex communications. The performing component 720 may be configured to perform full-duplex communications and to perform half-duplex communications.

In other optional or additional aspects, the UE unified TCI component 198 may include a stopping component 730 and a discarding component 740. The stopping component 730 may be configured to stop performing additional full-duplex communications and/or additional half-duplex communications. The discarding component 740 may be configured to discard additional configuration information.

Alternatively or additionally, the set of components may be separate and distinct from the UE unified TCI component 198. In other aspects, one or more components of the set of components may include or may be implemented within a controller/processor (e.g., the TX processor 356, the RX processor 353, the controller/processor 355), a memory (e.g., the memory 357), or a combination thereof, of the UE 104 described in FIGS. 1 and 3-6. Alternatively or additionally, one or more components of the set of components may be implemented at least in part as software stored in a memory, such as the memory 357. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIGS. 1 and 3-6.

Referring to FIGS. 7-11, in operation, an apparatus 700 may perform a method 800 of wireless communication at a UE 104. Alternatively or additionally, the method 800 may be performed by the UE 104 (which may include the memory 357 and which may be the entire UE 104 and/or one or more components of the UE 104 such as the UE unified TCI component 198, the TX processor 356, the RX processor 353, and/or the controller/processor 355). The method 800 may be performed by the UE unified TCI component 198 in communication with the apparatus 708 (e.g., base station 102).

Figure 8:
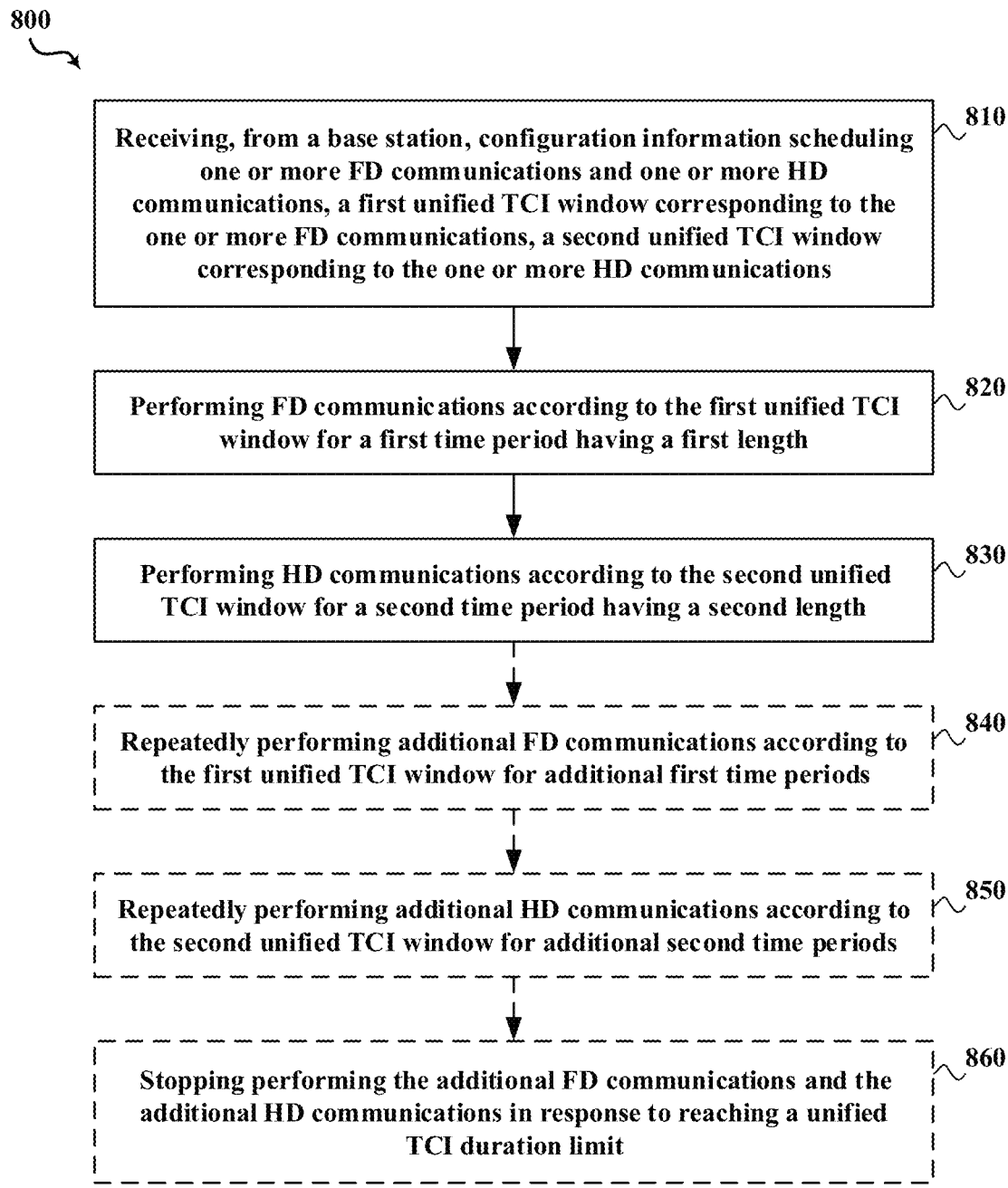
FIG. 8 is a flowchart of a method of wireless communication by a UE of a wireless communication network, in accordance with various aspects of the present disclosure.

At block 810 of FIG. 8, the method 800 includes receiving, from a base station, configuration information scheduling one or more full-duplex communications and one or more half-duplex communications, a first unified TCI window corresponding to the one or more full-duplex communications, a second unified TCI window corresponding to the one or more half-duplex communications. For example, in an aspect, the UE 104, the UE unified TCI component 198, and/or the receiving component 710 may be configured to or may comprise means for receiving, from a base station 102, configuration information 630 scheduling one or more full-duplex communications and one or more half-duplex communications, a first unified TCI window 610 corresponding to the one or more full-duplex communications, a second unified TCI window 620 corresponding to the one or more half-duplex communications.

For example, the receiving at block 810 may include receiving, from the base station 102, the configuration information 630 scheduling one or more full-duplex communications and one or more half-duplex communications, as described above in reference to FIG. 6.

In some aspects, the first unified TCI window 610 may be associated with a common full-duplex TCI state for the full-duplex communications. The common full-duplex TCI state may comprise a single bi-directional (e.g., downlink/uplink) TCI state corresponding to one or more downlink channels/reference signals and one or more uplink channels/reference signals for a downlink/uplink beam pair with which the full-duplex communications may be performed. Alternatively or additionally, the common full-duplex TCI state may comprise a downlink TCI state corresponding to one or more downlink channels/reference signals for a downlink beam of a downlink/uplink beam pair and an uplink TCI state corresponding to one or more uplink channels/reference signals for an uplink beam of the downlink/uplink beam pair with which the full-duplex communications may be performed.

In other optional or additional aspects, the second unified TCI window may be associated with a joint common TCI state for the half-duplex communications. The joint common TCI state may comprise a joint downlink/uplink common TCI state indicating a common beam for one or more downlink channels/reference signals and one or more uplink channels/reference signals of the half-duplex communications. Alternatively or additionally, the joint common TCI state may comprise a separate downlink common TCI state indicating a common beam for receiving at least two downlink channels/reference signals and a separate uplink common TCI state indicating a common beam for transmitting at least two uplink channels/reference signals.

In other optional or additional aspects, the receiving at block 810 may include selecting, according to a predefined rule, the first unified TCI window 610 for the full-duplex communications and the second unified TCI window 620 for the half-duplex communications, as described above in reference to FIG. 6. Alternatively or additionally, the receiving at block 810 may include preventing communications during a gap duration prior to switching from performing the half-duplex communications to perform the full-duplex communications.

In other optional or additional aspects, the receiving at block 810 may include receiving, via RRC signaling, additional configuration information indicating a unified TCI window pattern within a unified TCI duration limit, as described above in reference to FIG. 6. In such aspects, the unified TCI window pattern may assign a portion of the unified TCI duration limit to the first unified TCI window 610. Alternatively or additionally, the unified TCI window pattern may assign a remaining portion of the unified TCI duration limit to the second unified TCI window 620. In other optional or additional aspects, the unified TCI window pattern may define a gap duration for switching from the half-duplex communications to the full-duplex communications.

In other optional or additional aspects, the unified TCI window pattern may comprise a periodic pattern within the unified TCI duration limit. Alternatively or additionally, the unified TCI window pattern may comprise an aperiodic pattern within the unified TCI duration limit.

In other optional or additional aspects, the receiving at block 810 may include receiving DCI indicating a reference time to start the unified TCI window pattern. Alternatively or additionally, the receiving at block 810 may include selecting a start time of the unified TCI window pattern according to a first transmission end time of the configuration information 630 and/or according to a second transmission end time of an acknowledgement of the configuration information 630. In other optional or additional aspects, the receiving at block 810 may include selecting a start time of the unified TCI window pattern according to a first scheduled communication of the one or more full-duplex communications and the one or more half-duplex communications.

Further, for example, the receiving at block 810 may be performed to configure the unified TCI windows and corresponding unified TCI states for performing full-duplex communications and/or half-duplex communications. Advantageously, the unified TCI windows may provide for joint configuration of downlink channels and/or beams and uplink channels and/or beams for full-duplex communications and half-duplex communications without introducing an activation latency to apply an activation command. Thus, aspects presented herein may potentially reduce latency, increase spectrum efficiency, and increase resource utilization when compared to conventional wireless communication systems.

At block 820 of FIG. 8, the method 800 includes performing full-duplex communications according to the first unified TCI window for a first time period having a first length. For example, in an aspect, the UE 104, the UE unified TCI component 198, and/or the performing component 720 may be configured to or may comprise means for performing full-duplex communications according to the first unified TCI window 610 for a first time period having a first length.

For example, the performing at block 820 may include performing full-duplex communications according to the first unified TCI window 610, as described above in reference to FIG. 6.

In some aspects, the performing at block 820 may include applying the downlink TCI state of the common full-duplex TCI state to a first set of downlink channels of the full-duplex communications. Alternatively or additionally, the performing at block 820 may include applying the uplink TCI state of the common full-duplex TCI state to a first set of uplink channels of the full-duplex communications.

In other optional or additional aspects, the performing at block 820 may include applying the common full-duplex TCI state to full-duplex communications of a first plurality of component carriers and/or to a second plurality of component carriers.

Further, for example, the performing at block 820 may be performed to effect the full-duplex communications as scheduled and/or configured by the configuration information 630.

At block 830 of FIG. 8, the method 800 includes performing half-duplex communications according to the second unified TCI window for a second time period having a second length. For example, in an aspect, the UE 104, the UE unified TCI component 198, and/or the performing component 720 may be configured to or may comprise means for performing half-duplex communications according to the second unified TCI window 620 for a second time period having a second length.

For example, the performing at block 830 may include performing half-duplex communications according to the second unified TCI window 620, as described above in reference to FIG. 6.

In some aspects, the performing at block 830 may include applying the joint common TCI state to a second set of downlink channels of the half-duplex communications. Alternatively or additionally, the performing at block 830 may include applying the joint common TCI state to a second set of uplink channels of the half-duplex communications.

In other optional or additional aspects, the performing at block 830 may include applying the joint common TCI state to half-duplex communications of a first plurality of component carriers and/or to a second plurality of component carriers.

Further, for example, the performing at block 830 may be performed to effect the half-duplex communications as scheduled and/or configured by the configuration information 630.

In an optional or additional aspect that may be combined with any other aspect, at block 840 of FIG. 8, the method 800 may include repeatedly performing additional full-duplex communications according to the first unified TCI window for additional first time periods. For example, in an aspect, the UE 104, the UE unified TCI component 198, and/or the performing component 720 may be configured to or may comprise means for repeatedly performing additional full-duplex communications according to the first unified TCI window for additional first time periods.

For example, the performing at block 840 may include repeatedly performing additional full-duplex communications according to one or more first unified TCI windows 610, as described above in reference to FIG. 6.

Further, for example, the performing at block 840 may be performed to effect additional full-duplex communications as scheduled and/or configured by the configuration information 630.

In an optional or additional aspect that may be combined with any other aspect, at block 850 of FIG. 8, the method 800 may include repeatedly performing additional half-duplex communications according to the second unified TCI window for additional second time periods. For example, in an aspect, the UE 104, the UE unified TCI component 198, and/or the performing component 720 may be configured to or may comprise means for repeatedly performing additional half-duplex communications according to the second unified TCI window for additional second time periods.

For example, the performing at block 850 may include repeatedly performing additional half-duplex communications to one or more second unified TCI windows 620, as described above in reference to FIG. 6.

Further, for example, the performing at block 850 may be performed to effect additional half-duplex communications as scheduled and/or configured by the configuration information 630.

In an optional or additional aspect that may be combined with any other aspect, at block 860 of FIG. 8, the method 800 may include stopping performing the additional full-duplex communications and the additional half-duplex communications in response to reaching a unified TCI duration limit. For example, in an aspect, the UE 104, the UE unified TCI component 198, and/or the stopping component 730 may be configured to or may comprise means for stopping performing the additional full-duplex communications and the additional half-duplex communications in response to reaching a unified TCI duration limit.

For example, the stopping at block 860 may include stop performing the full-duplex communications according to the full-duplex unified TCI windows 610 and/or stop performing the half-duplex communications according to the half-duplex unified TCI windows 620 if or when the unified TCI duration limit has been reached, as described above in reference to FIG. 6.

Further, for example, the stopping at block 860 may be performed to effect the full-duplex communications and the half-duplex communications as scheduled and/or configured by the configuration information 630.

Figure 9:
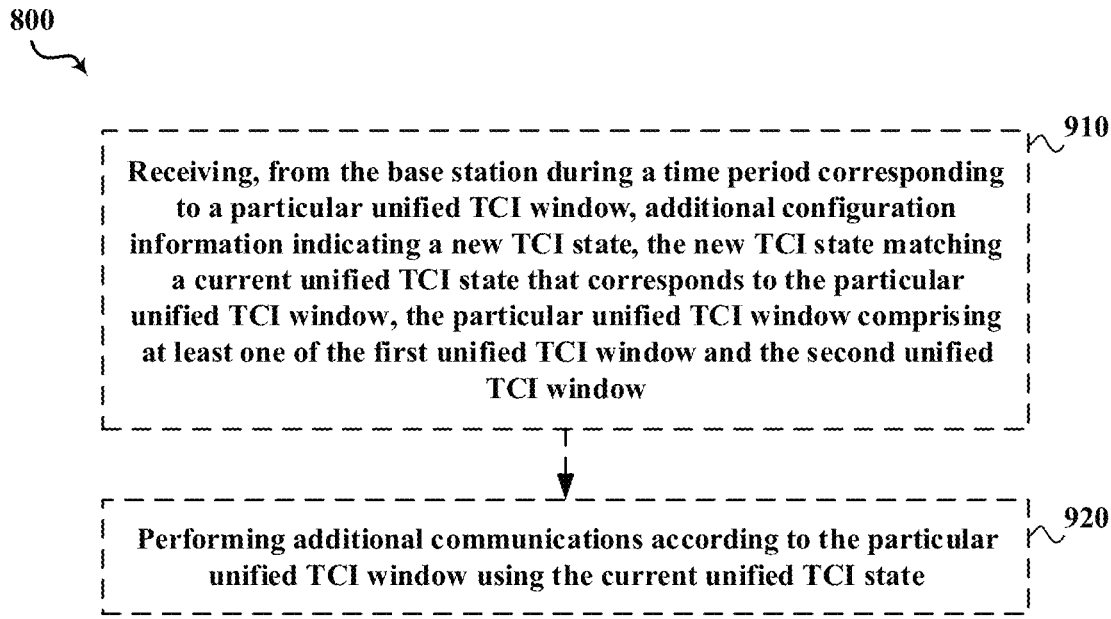
FIG. 9 is a flowchart of first additional or optional steps for the method of wireless communication by a UE of a wireless communication network, in accordance with various aspects of the present disclosure.

Referring to FIG. 9, in an optional or additional aspect that may be combined with any other aspect, at block 910, the method 800 may include receiving, from the base station during a time period corresponding to a particular unified TCI window, additional configuration information indicating a new TCI state, the new TCI state matching a current unified TCI state that corresponds to the particular unified TCI window, the particular unified TCI window comprising at least one of the first unified TCI window and the second unified TCI window. For example, in an aspect, the UE 104, the UE unified TCI component 198, and/or the receiving component 710 may be configured to or may comprise means for receiving, from the base station during a time period corresponding to a particular unified TCI window, additional configuration information indicating a new TCI state, the new TCI state matching a current unified TCI state that corresponds to the particular unified TCI window, the particular unified TCI window comprising at least one of the first unified TCI window and the second unified TCI window.

In an optional or additional aspect that may be combined with any other aspect, at block 920, the method 800 may include performing additional communications according to the particular unified TCI window using the current unified TCI state. For example, in an aspect, the UE 104, the UE unified TCI component 198, and/or the performing component 720 may be configured to or may comprise means for performing additional communications according to the particular unified TCI window using the current unified TCI state.

Figure 10:
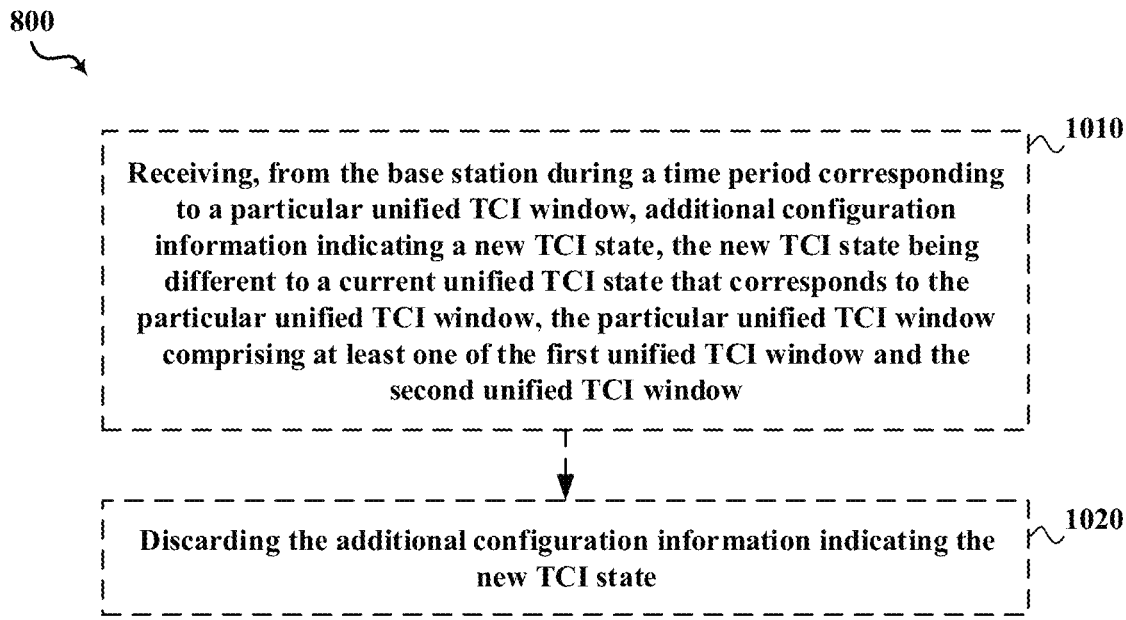
FIG. 10 is a flowchart of second additional or optional steps for the method of wireless communication by a UE of a wireless communication network, in accordance with various aspects of the present disclosure.

Referring to FIG. 10, in an optional or additional aspect that may be combined with any other aspect, at block 1010, the method 800 may include receiving, from the base station during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window. For example, in an aspect, the UE 104, the UE unified TCI component 198, and/or the receiving component 710 may be configured to or may comprise means for receiving, from the base station during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window.

In an optional or additional aspect that may be combined with any other aspect, at block 1020, the method 800 may include discarding the additional configuration information indicating the new TCI state. For example, in an aspect, the UE 104, the UE unified TCI component 198, and/or the discarding component 740 may be configured to or may comprise means for discarding the additional configuration information indicating the new TCI state.

Figure 11:
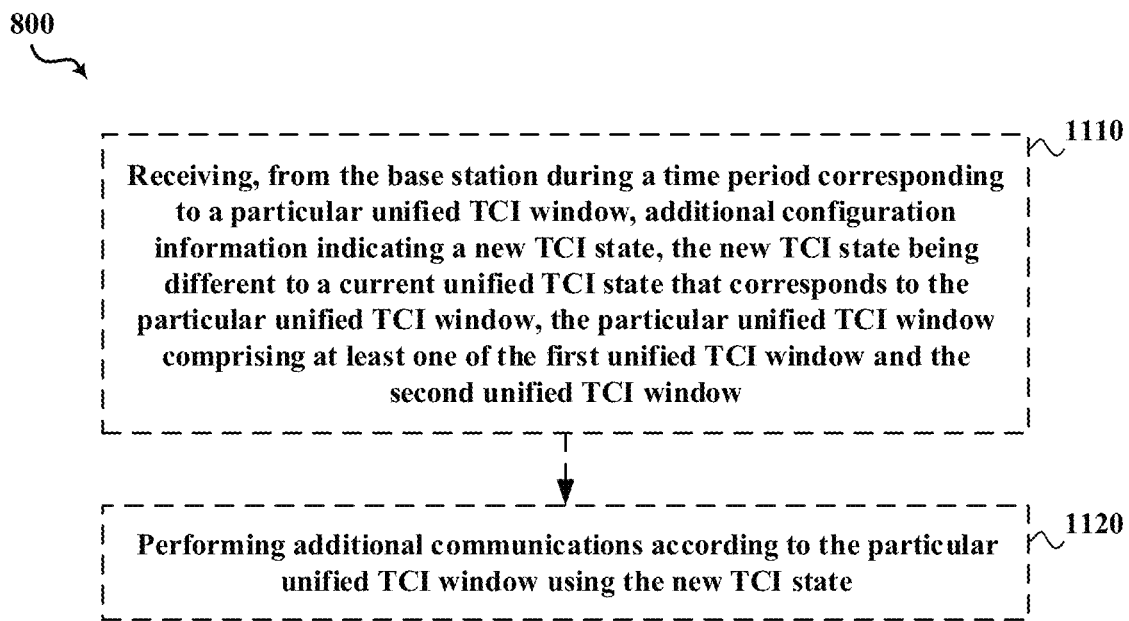
FIG. 11 is a flowchart of third additional or optional steps for the method of wireless communication by a UE of a wireless communication network, in accordance with various aspects of the present disclosure.

Referring to FIG. 11, in an optional or additional aspect that may be combined with any other aspect, at block 1110, the method 800 may include receiving, from the base station during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window. For example, in an aspect, the UE 104, the UE unified TCI component 198, and/or the receiving component 710 may be configured to or may comprise means for receiving, from the base station during a time period corresponding to a particular unified TCI window, additional configuration information indicating a new TCI state, the new TCI state matching a current unified TCI state that corresponds to the particular unified TCI window, the particular unified TCI window comprising at least one of the first unified TCI window and the second unified TCI window.

In an optional or additional aspect that may be combined with any other aspect, at block 1120, the method 800 may include performing additional communications using the new TCI state. For example, in an aspect, the UE 104, the UE unified TCI component 198, and/or the performing component 720 may be configured to or may comprise means for performing additional communications using the new TCI state.

Figure 12:
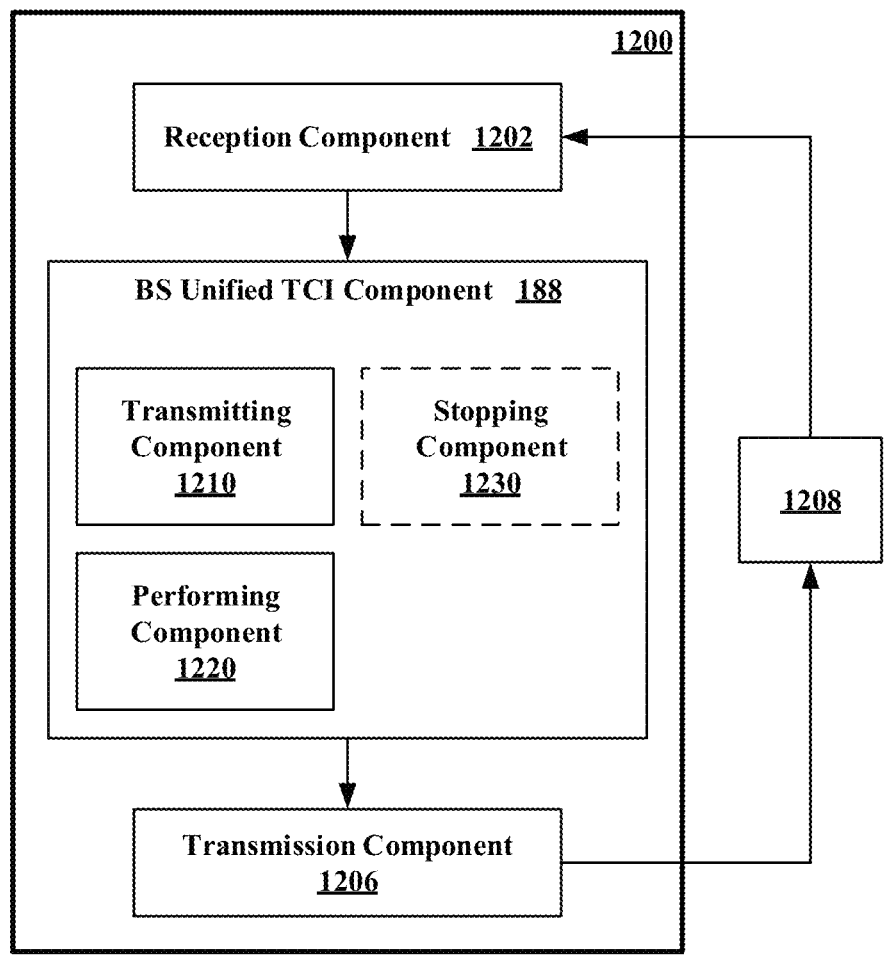
FIG. 12 is a diagram illustrating an example apparatus, such as a base station, for wireless communication in a wireless communication network, in accordance with various aspects of the present disclosure.

FIG. 12 is a block diagram of an example apparatus 1200 for wireless communication by a base station of a wireless communication network. The apparatus 1200 may be a base station 102 (e.g., base station 102 of FIGS. 1 and 3) or a base station 102 may include the apparatus 1200. In some aspects, the apparatus 1200 may include a reception component 1202 configured to receive wireless communications from another apparatus (e.g., apparatus 1208), a BS unified TCI component 188 configured to schedule full-duplex and half-duplex communications using unified TCI windows, a transmission component 1206 configured to transmit wireless communications to another apparatus (e.g., apparatus 1208), and which may be in communication with one another (e.g., via b uses or electrical connections). As shown, the apparatus 1200 may be in communication with another apparatus 1208 (such as a UE 104, or another wireless communication device) using the reception component 1202 and the transmission component 1206.

In some aspects, the apparatus 1200 may be configured to perform one or more operations described herein in connection with FIGS. 1 and 3-6. Alternatively or additionally, the apparatus 1200 may be configured to perform one or more processes described herein, such as method 1300 of FIGS. 13-15. In some aspects, the apparatus 1200 may include one or more components of the base station 102 described above in connection with FIGS. 1 and 3-6.

The reception component 1202 may receive communications, such as reference signals, control information, data communications, or a combination thereof, from the apparatus 1208. The reception component 1202 may provide received communications to one or more other components of the apparatus 1200, such as the BS unified TCI component 188. In some aspects, the reception component 1202 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the base station 102 described above in connection with FIGS. 1 and 3.

The transmission component 1206 may transmit communications, such as reference signals, control information, data communications, or a combination thereof, to the apparatus 1208. In some aspects, the BS unified TCI component 188 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In other aspects, the transmission component 1206 may include one or more antennas, a modulator, a transmit MIMO processor, a transmit processor, a controller/processor, a memory, or a combination thereof, of the base station 102 described above in connection with FIGS. 1 and 3. In some aspects, the transmission component 1206 may be co-located with the reception component 1202 in a transceiver or transceiver component.

The BS unified TCI component 188 may be configured to schedule full-duplex and half-duplex communications using unified TCI windows. In some aspects, the BS unified TCI component 188 may include a set of components, such as a transmitting component 1210 and a performing component 1220. The transmitting component 1210 may be configured to transmit configuration information scheduling one or more full-duplex communications and one or more half-duplex communications. The performing component 1220 may be configured to perform full-duplex communications and to perform half-duplex communications.

In other optional or additional aspects, the BS unified TCI component 188 may include a stopping component 730 configured to stop performing additional full-duplex communications and the additional half-duplex communications.

Alternatively or additionally, the set of components may be separate and distinct from the BS unified TCI component 188. In other aspects, one or more components of the set of components may include or may be implemented within a controller/processor (e.g., the TX processor 316, the RX processor 313, the controller/processor 315), a memory (e.g., the memory 317), or a combination thereof, of the base station 102 described in FIGS. 1 and 3. Alternatively or additionally, one or more components of the set of components may be implemented at least in part as software stored in a memory, such as the memory 317. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIGS. 1 and 3-6.

Referring to FIGS. 12-15, in operation, an apparatus 1200 may perform a method 1300 of wireless communication at a network node. Alternatively or additionally, the method 1300 may be performed by the base station 102 (which may include the memory 317 and which may be the entire base station 102 and/or one or more components of the base station 102 such as the BS unified TCI component 188, the TX processor 316, the RX processor 313, and/or the controller/processor 315). The method 1300 may be performed by the BS unified TCI component 188 in communication with the apparatus 1208 (e.g., UE 104).

Figure 13:
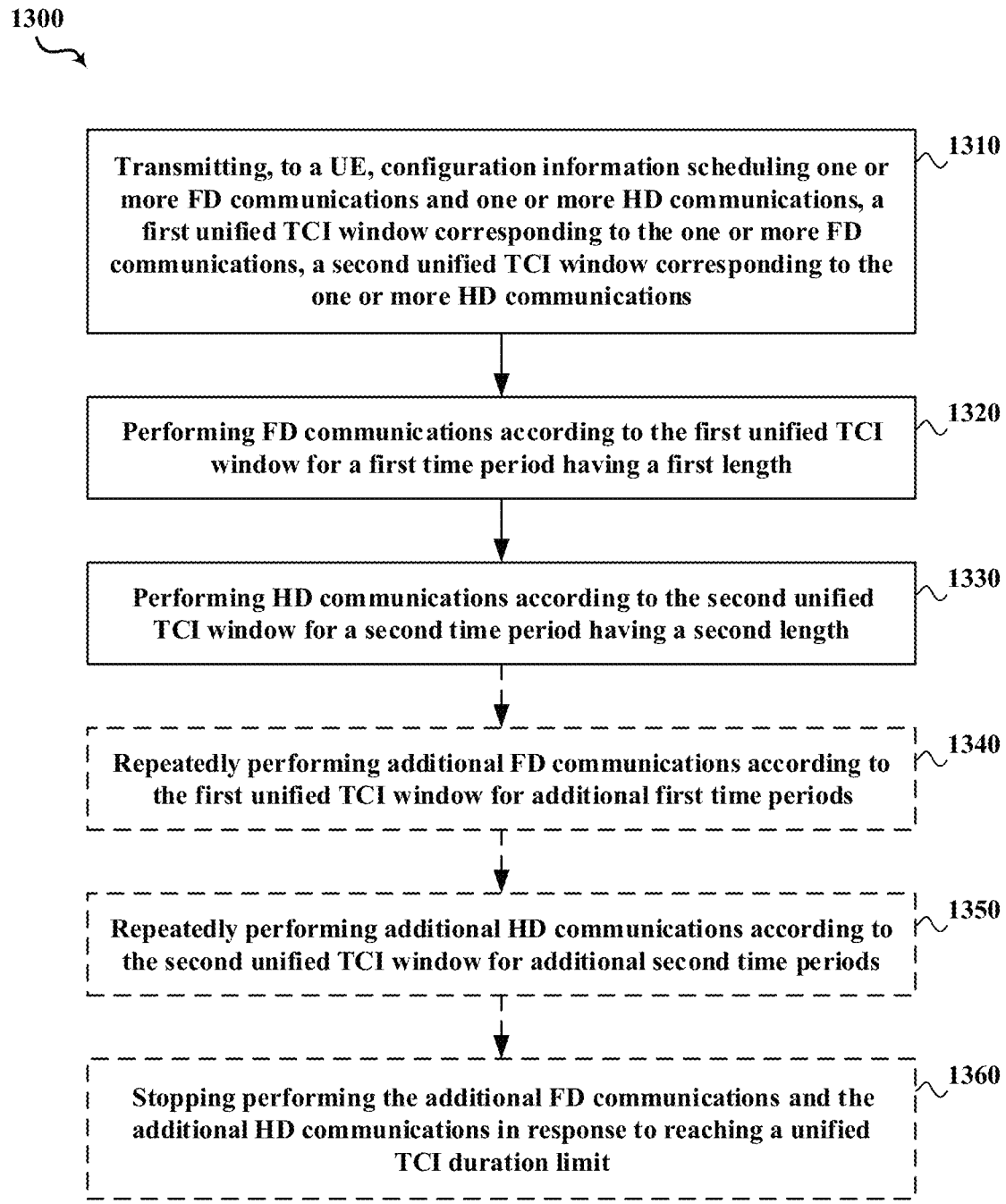
FIG. 13 is a flowchart of a method of wireless communication by a base station of a wireless communication network, in accordance with various aspects of the present disclosure.

At block 1310 of FIG. 13, the method 1300 includes transmitting, to a UE, configuration information scheduling one or more full-duplex communications and one or more half-duplex communications, a first unified TCI window corresponding to the one or more full-duplex communications, a second unified TCI window corresponding to the one or more half-duplex communications. For example, in an aspect, the base station 102, the BS unified TCI component 188, and/or the transmitting component 1210 may be configured to or may comprise means for transmitting, to a UE 104, configuration information 630 scheduling one or more full-duplex communications and one or more half-duplex communications, a first unified TCI window 610 corresponding to the one or more full-duplex communications, a second unified TCI window 620 corresponding to the one or more half-duplex communications.

For example, the transmitting at block 1310 may include transmitting the configuration information 630 scheduling the one or more full-duplex communications and/or the one or more half-duplex communications, as described above in reference to FIG. 6.

In some aspects, the first unified TCI window 610 may be associated with a common full-duplex TCI state for the full-duplex communications. The common full-duplex TCI state may comprise a single bi-directional (e.g., downlink/uplink) TCI state corresponding to one or more downlink channels/reference signals and one or more uplink channels/reference signals for a downlink/uplink beam pair with which the full-duplex communications may be performed. Alternatively or additionally, the common full-duplex TCI state may comprise a downlink TCI state corresponding to one or more downlink channels/reference signals for a downlink beam of a downlink/uplink beam pair and an uplink TCI state corresponding to one or more uplink channels/reference signals for an uplink beam of the downlink/uplink beam pair with which the full-duplex communications may be performed.

In other optional or additional aspects, the second unified TCI window may be associated with a joint common TCI state for the half-duplex communications. The joint common TCI state may comprise a joint downlink/uplink common TCI state indicating a common beam for one or more downlink channels/reference signals and one or more uplink channels/reference signals of the half-duplex communications. Alternatively or additionally, the joint common TCI state may comprise a separate downlink common TCI state indicating a common beam for receiving at least two downlink channels/reference signals and a separate uplink common TCI state indicating a common beam for transmitting at least two uplink channels/reference signals.

In other optional or additional aspects, the transmitting at block 1310 may include transmitting, via RRC signaling, additional configuration information indicating a unified TCI window pattern within a unified TCI duration limit, as described above in reference to FIG. 6. In such aspects, the unified TCI window pattern may assign a portion of the unified TCI duration limit to the first unified TCI window 610. Alternatively or additionally, the unified TCI window pattern may assign a remaining portion of the unified TCI duration limit to the second unified TCI window 620. In other optional or additional aspects, the unified TCI window pattern may define a gap duration for switching from the half-duplex communications to the full-duplex communications.

In other optional or additional aspects, the unified TCI window pattern may comprise a periodic pattern within the unified TCI duration limit. Alternatively or additionally, the unified TCI window pattern may comprise an aperiodic pattern within the unified TCI duration limit.

In other optional or additional aspects, the transmitting at block 1310 may include transmitting DCI indicating a reference time to start the unified TCI window pattern.

Further, for example, the transmitting at block 1310 may be performed to configure the unified TCI windows and corresponding unified TCI states for performing full-duplex communications and/or half-duplex communications. Advantageously, the unified TCI windows may provide for joint configuration of downlink channels and/or beams and uplink channels and/or beams for full-duplex communications and half-duplex communications without introducing an activation latency to apply an activation command. Thus, aspects presented herein may potentially reduce latency, increase spectrum efficiency, and increase resource utilization when compared to conventional wireless communication systems.

At block 1320 of FIG. 13, the method 1300 includes performing full-duplex communications according to the first unified TCI window for a first time period having a first length. For example, in an aspect, the base station 102, the BS unified TCI component 188, and/or the performing component 1220 may be configured to or may comprise means for performing full-duplex communications according to the first unified TCI window for a first time period having a first length.

For example, the performing at block 1320 may include performing full-duplex communications according to the first unified TCI window 610, as described above in reference to FIG. 6.

In some aspects, the performing at block 1320 may include applying the downlink TCI state of the common full-duplex TCI state to a first set of downlink channels of the full-duplex communications. Alternatively or additionally, the performing at block 1320 may include applying the uplink TCI state of the common full-duplex TCI state to a first set of uplink channels of the full-duplex communications.

In other optional or additional aspects, the performing at block 1320 may include applying the common full-duplex TCI state to full-duplex communications of a first plurality of component carriers and/or to a second plurality of component carriers.

Further, for example, the performing at block 1320 may be performed to effect the full-duplex communications as scheduled and/or configured by the configuration information 630.

At block 1330 of FIG. 13, the method 1300 includes performing half-duplex communications according to the second unified TCI window for a second time period having a second length. For example, in an aspect, the base station 102, the BS unified TCI component 188, and/or the performing component 1220 may be configured to or may comprise means for performing half-duplex communications according to the second unified TCI window 620 for a second time period having a second length.

For example, the performing at block 1330 may include performing half-duplex communications according to the second unified TCI window 620, as described above in reference to FIG. 6.

In some aspects, the performing at block 1330 may include applying the joint common TCI state to a second set of downlink channels of the half-duplex communications. Alternatively or additionally, the performing at block 1330 may include applying the joint common TCI state to a second set of uplink channels of the half-duplex communications.

In other optional or additional aspects, the performing at block 1330 may include applying the joint common TCI state to half-duplex communications of a first plurality of component carriers and/or to a second plurality of component carriers.

Further, for example, the performing at block 1330 may be performed to effect the half-duplex communications as scheduled and/or configured by the configuration information 630.

In an optional or additional aspect that may be combined with any other aspect, at block 1340 of FIG. 13, the method 1300 may include repeatedly performing additional full-duplex communications according to the first unified TCI window for additional first time periods. For example, in an aspect, the base station 102, the BS unified TCI component 188, and/or the performing component 1220 may be configured to or may comprise means for repeatedly performing additional full-duplex communications according to the first unified TCI window for additional first time periods.

For example, the performing at block 1340 may include repeatedly performing additional full-duplex communications according to one or more first unified TCI windows 610, as described above in reference to FIG. 6.

Further, for example, the performing at block 1340 may be performed to effect additional full-duplex communications as scheduled and/or configured by the configuration information 630.

In an optional or additional aspect that may be combined with any other aspect, at block 1350 of FIG. 13, the method 1300 may include repeatedly performing additional half-duplex communications according to the second unified TCI window for additional second time periods. For example, in an aspect, the base station 102, the BS unified TCI component 188, and/or the performing component 1220 may be configured to or may comprise means for repeatedly performing additional half-duplex communications according to the second unified TCI window for additional second time periods.

For example, the performing at block 1350 may include repeatedly performing additional half-duplex communications to one or more second unified TCI windows 620, as described above in reference to FIG. 6.

Further, for example, the performing at block 1350 may be performed to effect additional half-duplex communications as scheduled and/or configured by the configuration information 630.

In an optional or additional aspect that may be combined with any other aspect, at block 1360 of FIG. 13, the method 1300 may include stopping performing the additional full-duplex communications and the additional half-duplex communications in response to reaching a unified TCI duration limit. For example, in an aspect, the base station 102, the BS unified TCI component 188, and/or the stopping component 1230 may be configured to or may comprise means for stopping performing the additional full-duplex communications and the additional half-duplex communications in response to reaching a unified TCI duration limit.

For example, the stopping at block 1360 may include stop performing the full-duplex communications according to the full-duplex unified TCI windows 610 and/or stop performing the half-duplex communications according to the half-duplex unified TCI windows 620 if or when the unified TCI duration limit has been reached, as described above in reference to FIG. 6.

Further, for example, the stopping at block 1360 may be performed to effect the full-duplex communications and the half-duplex communications as scheduled and/or configured by the configuration information 630.

Referring to FIG. 14, in an optional or additional aspect that may be combined with any other aspect, at block 1410, the method 1300 may include transmitting, to the UE during a time period corresponding to a particular unified TCI window, additional configuration information indicating a new TCI state, the new TCI state being different from a current unified TCI state that corresponds to the particular unified TCI window, causing the UE to discard the additional configuration information indicating the new TCI state, the particular unified TCI window comprising at least one of the first unified TCI window and the second unified TCI window. For example, in an aspect, the base station 102, the BS unified TCI component 188, and/or the transmitting component 1210 may be configured to or may comprise means for transmitting, to the UE during a time period corresponding to a particular unified TCI window, additional configuration information indicating a new TCI state, the new TCI state being different from a current unified TCI state that corresponds to the particular unified TCI window, causing the UE to discard the additional configuration information indicating the new TCI state, the particular unified TCI window comprising at least one of the first unified TCI window and the second unified TCI window.

In an optional or additional aspect that may be combined with any other aspect, at block 1420, the method 1300 may include performing additional communications according to the particular unified TCI window using the current unified TCI state. For example, in an aspect, the base station 102, the BS unified TCI component 188, and/or the performing component 1220 may be configured to or may comprise means for performing additional communications according to the particular unified TCI window using the current unified TCI state.

Referring to FIG. 15, in an optional or additional aspect that may be combined with any other aspect, at block 1510, the method 1300 may include transmitting, to the UE during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window. For example, in an aspect, the base station 102, the BS unified TCI component 188, and/or the transmitting component 1210 may be configured to or may comprise means for transmitting, to the UE 104 during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window.

In an optional or additional aspect that may be combined with any other aspect, at block 1520, the method 1300 may include performing additional communications using the new TCI state. For example, in an aspect, the base station 102, the BS unified TCI component 188, and/or the performing component 1220 may be configured to or may comprise means for performing additional communications using the new TCI state.

Implementation examples are described in the following numbered clauses:

1. A method of wireless communication by a UE of a wireless communication network, comprising:
   receiving, from a base station, configuration information scheduling one or more full-duplex communications and one or more half-duplex communications, a first unified TCI window corresponding to the one or more full-duplex communications, a second unified TCI window corresponding to the one or more half-duplex communications;
   performing full-duplex communications according to the first unified TCI window for a first time period having a first length; and
   performing half-duplex communications according to the second unified TCI window for a second time period having a second length.

2. The method of clause 1, further comprising:
   repeatedly performing additional full-duplex communications according to the first unified TCI window for additional first time periods;
   repeatedly performing additional half-duplex communications according to the second unified TCI window for additional second time periods; and stopping performing the additional full-duplex communications and the additional half-duplex communications in response to reaching a unified TCI duration limit.

3. The method of clause 1 or 2,
wherein the first unified TCI window is associated with a common full-duplex TCI state for the full-duplex communications, the common full-duplex TCI state comprising a pair of TCI states, the pair of the TCI states comprising a downlink TCI state and an uplink TCI state; and
wherein the second unified TCI window is associated with a joint common TCI state for the half-duplex communications, the joint common TCI state corresponding to uplink communications of the half-duplex communications and to downlink communications of the half-duplex communications.

4. The method of any preceding clause 1 to 3,
wherein performing the full-duplex communications comprises:
applying the downlink TCI state of the common full-duplex TCI state to a first set of downlink channels of the full-duplex communications; and
applying the uplink TCI state of the common full-duplex TCI state to a first set of uplink channels of the full-duplex communications; and
wherein performing the half-duplex communications comprises:
applying the joint common TCI state to a second set of downlink channels of the half-duplex communications; and
applying the joint common TCI state to a second set of uplink channels of the half-duplex communications.

5. The method of any preceding clause 1 to 4,
wherein performing the full-duplex communications comprises applying the common full-duplex TCI state to full-duplex communications of a first plurality of component carriers; and
wherein performing the half-duplex communications comprises applying the joint common TCI state to half-duplex communications of a second plurality of component carriers.

6. The method of any preceding clause 1 to 5, further comprising:
receiving, from the base station during a time period corresponding to a particular unified TCI window, additional configuration information indicating a new TCI state, the new TCI state matching a current unified TCI state that corresponds to the particular unified TCI window, the particular unified TCI window comprising at least one of the first unified TCI window and the second unified TCI window; and
performing additional communications according to the particular unified TCI window using the current unified TCI state.

7. The method of any preceding clause 1 to 6, further comprising:
receiving, from the base station during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window; and
discarding the additional configuration information indicating the new TCI state.

8. The method of any preceding clause 1 to 7, further comprising:
receiving, from the base station during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window; and
performing additional communications using the new TCI state.

9. The method of any preceding clause 1 to 8, wherein receiving the configuration information comprises:
selecting, according to a predefined rule, the first unified TCI window for the full-duplex communications;
selecting, according to the predefined rule, the second unified TCI window for the half-duplex communications; and
preventing communications during a gap duration prior to switching from performing the half-duplex communications to performing the full-duplex communications.

10. The method of any preceding clause 1 to 9, wherein receiving the configuration information comprises:
receiving, via RRC signaling, additional configuration information indicating a unified TCI window pattern within a unified TCI duration limit, wherein the unified TCI window pattern assigns a portion of the unified TCI duration limit to the first unified TCI window, wherein the unified TCI window pattern assigns a remaining portion of the unified TCI duration limit to the second unified TCI window, and wherein the unified TCI window pattern defines a gap duration for switching from the half-duplex communications to the full-duplex communications.

11. The method of any preceding clause 1 to 10, wherein the unified TCI window pattern comprises a periodic pattern within the unified TCI duration limit.

12. The method of any preceding clause 1 to 11, wherein the unified TCI window pattern comprises an aperiodic pattern within the unified TCI duration limit.

13. The method of any preceding clause 1 to 12, wherein receiving the configuration information comprises:
receiving DCI indicating a reference time to start the unified TCI window pattern.

14. The method of any preceding clause 1 to 13, further comprising:
selecting a start time of the unified TCI window pattern according to a first transmission end time of the configuration information or according to a second transmission end time of an acknowledgement of the configuration information.

15. The method of any preceding clause 1 to 14, further comprising:
selecting a start time of the unified TCI window pattern according to a first scheduled communication of the one or more full-duplex communications and the one or more half-duplex communications.

16. An apparatus of wireless communication by a UE of a wireless communication network, comprising a memory storing instructions, and a processor communicatively coupled with the memory and configured to execute the instructions to perform one or more methods of any preceding clause 1 to 15.

17. An apparatus of wireless communication by a UE of a wireless communication network, comprising means for performing one or more methods of any preceding clause 1 to 15.

18. A computer-readable medium storing instructions of wireless communication by a UE of a wireless communication network, executable by a processor, to perform one or more methods of any preceding clause 1 to 15.

19. A method of wireless communication by a network node of a wireless communication network, comprising:
   transmitting, to a UE, configuration information scheduling one or more full-duplex communications and one or more half-duplex communications, a first unified TCI window corresponding to the one or more full-duplex communications, a second unified TCI window corresponding to the one or more half-duplex communications;
   performing full-duplex communications according to the first unified TCI window for a first time period having a first length; and
   performing half-duplex communications according to the second unified TCI window for a second time period having a second length.

20. The method of clause 19, further comprising:
   repeatedly performing additional full-duplex communications according to the first unified TCI window for additional first time periods;
   repeatedly performing additional half-duplex communications according to the second unified TCI window for additional second time periods; and
   stopping performing the additional full-duplex communications and the additional half-duplex communications in response to reaching a unified TCI duration limit.

21. The method of clause 19 or 20,
   wherein the first unified TCI window is associated with a common full-duplex TCI state for the full-duplex communications, the common full-duplex TCI state comprising a pair of TCI states, the pair of the TCI states comprising a downlink TCI state and an uplink TCI state; and
   wherein the second unified TCI window is associated with a joint common TCI state for the half-duplex communications, the joint common TCI state corresponding to uplink communications of the half-duplex communications and to downlink communications of the half-duplex communications.

22. The method of any preceding clause 19 to 21,
   wherein performing the full-duplex communications comprises:
      applying the downlink TCI state of the common full-duplex TCI state to a first set of downlink channels of the full-duplex communications; and
      applying the uplink TCI state of the common full-duplex TCI state to a first set of uplink channels of the full-duplex communications; and
   wherein performing the half-duplex communications comprises:
      applying the joint common TCI state to a second set of downlink channels of the half-duplex communications; and
      applying the joint common TCI state to a second set of uplink channels of the half-duplex communications.

23. The method of any preceding clause 19 to 22,
   wherein performing the full-duplex communications comprises applying the common full-duplex TCI state to full-duplex communications of a first plurality of component carriers; and
   wherein performing the half-duplex communications comprises applying the joint common TCI state to half-duplex communications of a second plurality of component carriers.

24. The method of any preceding clause 19 to 23, further comprising:
   transmitting, to the UE during a time period corresponding to a particular unified TCI window, additional configuration information indicating a new TCI state, the new TCI state being different from a current unified TCI state that corresponds to the particular unified TCI window, causing the UE to discard the additional configuration information indicating the new TCI state, the particular unified TCI window comprising at least one of the first unified TCI window and the second unified TCI window; and
   performing additional communications according to the particular unified TCI window using the current unified TCI state.

25. The method of any preceding clause 19 to 24, further comprising:
   transmitting, to the UE during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window; and
   performing additional communications using the new TCI state.

26. The method of any preceding clause 19 to 25, wherein transmitting the configuration information comprises:
   transmitting, to the UE via RRC signaling, additional configuration information indicating a unified TCI window pattern within a unified TCI duration limit, wherein the unified TCI window pattern assigns a portion of the unified TCI duration limit to the first unified TCI window, wherein the unified TCI window pattern assigns a remaining portion of the unified TCI duration limit to the second unified TCI window, and wherein the unified TCI window pattern defines a gap duration for switching from performing the half-duplex communications to performing the full-duplex communications.

27. The method of any preceding clause 19 to 26, wherein the unified TCI window pattern comprises a periodic pattern within the unified TCI duration limit.

28. The method of any preceding clause 19 to 27, wherein the unified TCI window pattern comprises an aperiodic pattern within the unified TCI duration limit.

29. The method of any preceding clause 19 to 28, wherein transmitting the configuration information comprises:
   transmitting DCI indicating a reference time to start the unified TCI window pattern.

30. An apparatus of wireless communication by a base station of a wireless communication network, comprising a memory storing instructions, and a processor communicatively coupled with the memory and configured to execute the instructions to perform one or more methods of any preceding clause 19 to 29.

31. An apparatus of wireless communication by a base station of a wireless communication network, comprising means for performing one or more methods of any preceding clause 19 to 29.

32. A computer-readable medium storing instructions of wireless communication by a base station of a wireless communication network, executable by a processor, to perform one or more methods of any preceding clause 19 to 29.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE) of a wireless communication network, comprising:
   receiving, from a base station, configuration information scheduling one or more full-duplex communications and one or more half-duplex communications, a first unified transmission configuration indicator (TCI) window corresponding to the one or more full-duplex communications, a second unified TCI window corresponding to the one or more half-duplex communications;
   performing full-duplex communications according to the first unified TCI window for a first time period having a first length; and
   performing half-duplex communications according to the second unified TCI window for a second time period having a second length.

2. The method of claim 1, further comprising:
   repeatedly performing additional full-duplex communications according to the first unified TCI window for additional first time periods;
   repeatedly performing additional half-duplex communications according to the second unified TCI window for additional second time periods; and
   stopping performing the additional full-duplex communications and the additional half-duplex communications in response to reaching a unified TCI duration limit.

3. The method of claim 1,
   wherein the first unified TCI window is associated with a common full-duplex TCI state for the full-duplex communications, the common full-duplex TCI state comprising a pair of TCI states, the pair of the TCI states comprising a downlink TCI state and an uplink TCI state; and
   wherein the second unified TCI window is associated with a joint common TCI state for the half-duplex communications, the joint common TCI state corresponding to uplink communications of the half-duplex communications and to downlink communications of the half-duplex communications.

4. The method of claim 3,
   wherein performing the full-duplex communications comprises:
      applying the downlink TCI state of the common full-duplex TCI state to a first set of downlink channels of the full-duplex communications; and
      applying the uplink TCI state of the common full-duplex TCI state to a first set of uplink channels of the full-duplex communications; and
   wherein performing the half-duplex communications comprises:
      applying the joint common TCI state to a second set of downlink channels of the half-duplex communications; and
      applying the joint common TCI state to a second set of uplink channels of the half-duplex communications.

5. The method of claim 3,
wherein performing the full-duplex communications comprises applying the common full-duplex TCI state to full-duplex communications of a first plurality of component carriers; and
wherein performing the half-duplex communications comprises applying the joint common TCI state to half-duplex communications of a second plurality of component carriers.

6. The method of claim 1, further comprising:
receiving, from the base station during a time period corresponding to a particular unified TCI window, additional configuration information indicating a new TCI state, the new TCI state matching a current unified TCI state that corresponds to the particular unified TCI window, the particular unified TCI window comprising at least one of the first unified TCI window and the second unified TCI window; and
performing additional communications according to the particular unified TCI window using the current unified TCI state.

7. The method of claim 1, further comprising:
receiving, from the base station during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window; and
discarding the additional configuration information indicating the new TCI state.

8. The method of claim 1, further comprising:
receiving, from the base station during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window; and
performing additional communications using the new TCI state.

9. The method of claim 1, wherein receiving the configuration information comprises:
selecting, according to a predefined rule, the first unified TCI window for the full-duplex communications;
selecting, according to the predefined rule, the second unified TCI window for the half-duplex communications; and
preventing communications during a gap duration prior to switching from performing the half-duplex communications to performing the full-duplex communications.

10. The method of claim 1, wherein receiving the configuration information comprises:
receiving, via radio resource control (RRC) signaling, additional configuration information indicating a unified TCI window pattern within a unified TCI duration limit, wherein the unified TCI window pattern assigns a portion of the unified TCI duration limit to the first unified TCI window, wherein the unified TCI window pattern assigns a remaining portion of the unified TCI duration limit to the second unified TCI window, and wherein the unified TCI window pattern defines a gap duration for switching from the half-duplex communications to the full-duplex communications.

11. The method of claim 10, wherein the unified TCI window pattern comprises a periodic pattern within the unified TCI duration limit.

12. The method of claim 10, wherein the unified TCI window pattern comprises an aperiodic pattern within the unified TCI duration limit.

13. The method of claim 10, wherein receiving the configuration information comprises:
receiving downlink control information (DCI) indicating a reference time to start the unified TCI window pattern.

14. The method of claim 10, further comprising:
selecting a start time of the unified TCI window pattern according to a first transmission end time of the configuration information or according to a second transmission end time of an acknowledgement of the configuration information.

15. The method of claim 10, further comprising:
selecting a start time of the unified TCI window pattern according to a first scheduled communication of the one or more full-duplex communications and the one or more half-duplex communications.

16. An apparatus of wireless communication by a user equipment (UE) of a wireless communication network, comprising:
a memory storing instructions; and
a processor communicatively coupled with the memory and configured to execute the instructions to:
receive, from a base station, configuration information scheduling one or more full-duplex communications and one or more half-duplex communications, a first unified transmission configuration indicator (TCI) window corresponding to the one or more full-duplex communications, a second unified TCI window corresponding to the one or more half-duplex communications;
perform full-duplex communications according to the first unified TCI window for a first time period having a first length; and
perform half-duplex communications according to the second unified TCI window for a second time period having a second length.

17. The apparatus of claim 16,
wherein the first unified TCI window is associated with a common full-duplex TCI state for the full-duplex communications, the common full-duplex TCI state comprising a pair of TCI states, the pair of the TCI states comprising a downlink TCI state and an uplink TCI state; and
wherein the second unified TCI window is associated with a joint common TCI state for the half-duplex communications, the joint common TCI state corresponding to uplink communications of the half-duplex communications and to downlink communications of the half-duplex communications.

18. A method of wireless communication by a network node of a wireless communication network, comprising:
transmitting, to a user equipment (UE), configuration information scheduling one or more full-duplex communications and one or more half-duplex communications, a first unified transmission configuration indicator (TCI) window corresponding to the one or more full-duplex communications, a second unified TCI window corresponding to the one or more half-duplex communications;

performing full-duplex communications according to the first unified TCI window for a first time period having a first length; and performing half-duplex communications according to the second unified TCI window for a second time period having a second length.

19. The method of claim 18, further comprising:

repeatedly performing additional full-duplex communications according to the first unified TCI window for additional first time periods;

repeatedly performing additional half-duplex communications according to the second unified TCI window for additional second time periods; and stopping performing the additional full-duplex communications and the additional half-duplex communications in response to reaching a unified TCI duration limit.

20. The method of claim 18, wherein the first unified TCI window is associated with a common full-duplex TCI state for the full-duplex communications, the common full-duplex TCI state comprising a pair of TCI states, the pair of the TCI states comprising a downlink TCI state and an uplink TCI state; and wherein the second unified TCI window is associated with a joint common TCI state for the half-duplex communications, the joint common TCI state corresponding to uplink communications of the half-duplex communications and to downlink communications of the half-duplex communications.

21. The method of claim 20, wherein performing the full-duplex communications comprises:

applying the downlink TCI state of the common full-duplex TCI state to a first set of downlink channels of the full-duplex communications; and applying the uplink TCI state of the common full-duplex TCI state to a first set of uplink channels of the full-duplex communications; and wherein performing the half-duplex communications comprises:

applying the joint common TCI state to a second set of downlink channels of the half-duplex communications; and applying the joint common TCI state to a second set of uplink channels of the half-duplex communications.

22. The method of claim 20, wherein performing the full-duplex communications comprises applying the common full-duplex TCI state to full-duplex communications of a first plurality of component carriers; and wherein performing the half-duplex communications comprises applying the joint common TCI state to half-duplex communications of a second plurality of component carriers.

23. The method of claim 18, further comprising:

transmitting, to the UE during a time period corresponding to a particular unified TCI window, additional configuration information indicating a new TCI state, the new TCI state being different from a current unified TCI state that corresponds to the particular unified TCI window, causing the UE to discard the additional configuration information indicating the new TCI state, the particular unified TCI window comprising at least one of the first unified TCI window and the second unified TCI window; and performing additional communications according to the particular unified TCI window using the current unified TCI state.

24. The method of claim 18, further comprising:

transmitting, to the UE during a time period corresponding to a particular unified TCI window, additional configuration information indicating a new TCI state, the new TCI state being different from a current unified TCI state that corresponds to the particular unified TCI window, the particular unified TCI window comprising at least one of the first unified TCI window and the second unified TCI window; and performing additional communications using the new TCI state.

25. The method of claim 18, wherein transmitting the configuration information comprises:

transmitting, to the UE via radio resource control (RRC) signaling, additional configuration information indicating a unified TCI window pattern within a unified TCI duration limit, wherein the unified TCI window pattern assigns a portion of the unified TCI duration limit to the first unified TCI window, wherein the unified TCI window pattern assigns a remaining portion of the unified TCI duration limit to the second unified TCI window, and wherein the unified TCI window pattern defines a gap duration for switching from performing the half-duplex communications to performing the full-duplex communications.

26. The method of claim 25, wherein the unified TCI window pattern comprises a periodic pattern within the unified TCI duration limit.

27. The method of claim 25, wherein the unified TCI window pattern comprises an aperiodic pattern within the unified TCI duration limit.

28. The method of claim 25, wherein transmitting the configuration information comprises:

transmitting downlink control information (DCI) indicating a reference time to start the unified TCI window pattern.

29. An apparatus of wireless communication by a network node of a wireless communication network, comprising:

a memory storing instructions; and a processor communicatively coupled with the memory and configured to execute the instructions to:

transmit, to a user equipment (UE), configuration information scheduling one or more full-duplex communications and one or more half-duplex communications, a first unified transmission configuration indicator (TCI) window corresponding to the one or more full-duplex communications, a second unified TCI window corresponding to the one or more half-duplex communications;

perform full-duplex communications according to the first unified TCI window for a first time period having a first length; and perform half-duplex communications according to the second unified TCI window for a second time period having a second length.

30. The apparatus of claim 29, wherein the first unified TCI window is associated with a common full-duplex TCI state for the full-duplex communications, the common full-duplex TCI state comprising a pair of TCI states, the pair of the TCI states comprising a downlink TCI state and an uplink TCI state; and wherein the second unified TCI window is associated with a joint common TCI state for the half-duplex communications, the joint common TCI state corresponding to uplink communications of the half-duplex communications and to downlink communications of the half-duplex communications.

\* \* \* \* \*